US008988385B2

(12) United States Patent
Seo et al.

(10) Patent No.: US 8,988,385 B2
(45) Date of Patent: Mar. 24, 2015

(54) APPARATUS FOR DRIVING TOUCH PANEL AND DISPLAY APPARATUS COMPRISING THE SAME

(75) Inventors: Seong Mo Seo, Goyang-si (KR); Dong Hoon Cha, Paju-si (KR); Oh Kyong Kwon, Seoul (KR); Ik Seok Yang, Seoul (KR)

(73) Assignees: LG Display Co., Ltd., Seoul (KR); Industry-University Cooperation Foundation Hanyang University, Seoul (KR)

( * ) Notice: Subject to any disclaimer, the term of this patent is extended or adjusted under 35 U.S.C. 154(b) by 129 days.

(21) Appl. No.: 13/339,901

(22) Filed: Dec. 29, 2011

(65) Prior Publication Data
US 2013/0038570 A1 Feb. 14, 2013

(30) Foreign Application Priority Data

Aug. 12, 2011 (KR) .......................... 10-2011-0080902

(51) Int. Cl.
*G06F 3/044* (2006.01)
*G06F 3/041* (2006.01)

(52) U.S. Cl.
CPC .............. *G06F 3/0416* (2013.01); *G06F 3/044* (2013.01)
USPC ........................................................ 345/174

(58) Field of Classification Search
None
See application file for complete search history.

(56) References Cited

U.S. PATENT DOCUMENTS

| 2010/0292945 | A1* | 11/2010 | Reynolds et al. | 702/65 |
|---|---|---|---|---|
| 2011/0122089 | A1* | 5/2011 | Kobayashi et al. | 345/174 |
| 2011/0193571 | A1* | 8/2011 | Lin et al. | 324/679 |
| 2011/0234523 | A1* | 9/2011 | Chang et al. | 345/173 |
| 2012/0105371 | A1* | 5/2012 | Hotelling et al. | 345/174 |
| 2012/0113045 | A1* | 5/2012 | Lai | 345/174 |

FOREIGN PATENT DOCUMENTS

| TW | 200506737 | 2/2005 |
|---|---|---|
| TW | 200841223 A | 10/2008 |
| TW | M345293 U | 11/2008 |

OTHER PUBLICATIONS

Examination Statement dated May 12, 2014 from the Taiwan Patent Office in counterpart Taiwanese application No. 100148470.

* cited by examiner

*Primary Examiner* — Amr Awad
*Assistant Examiner* — Donna Lui
(74) *Attorney, Agent, or Firm* — Morgan, Lewis & Bockius LLP

(57) ABSTRACT

Disclosed are a touch panel driving apparatus and a display device including the same, which lead to the enhancement of sensing sensitivity. The touch panel driving apparatus includes a touch control unit and a touch sensing unit. The touch sensing unit is connected to the receiving lines, and generates the digital touch information on the basis of change of a capacitance between two transmitting lines and one receiving line or generates the digital touch information on the basis of change of a capacitance of each of the receiving lines to supply the digital touch information to the touch control unit, according to the sensing control signal.

20 Claims, 10 Drawing Sheets

APPARATUS FOR DRIVING TOUCH PANEL AND DISPLAY APPARATUS COMPRISING THE SAME

CROSS-REFERENCE TO RELATED APPLICATIONS

This application claims the benefit of the Korean Patent Application No. 10-2011-0080902 filed on Aug. 12, 2011, which is hereby incorporated by reference as if fully set forth herein.

BACKGROUND

1. Field of the Invention

The present invention relates to a touch panel driving apparatus and a display device including the same, and more particularly, to a touch panel driving apparatus and a display device including the same, which lead to the enhancement of sensing sensitivity.

2. Discussion of the Related Art

Recently, touch panel driving apparatuses including a touch panel are being additionally applied as input apparatuses of various multimedia devices (for example, notebook computers, portable phones, smart phones, tablet personal computers, etc.) and various display devices (for example, monitors, televisions, etc.).

Typical touch panels are categorized into capacitive touch panels, resistive touch panels, infrared touch panels, and optical touch panels. Recently, various multimedia devices including a resistive touch panel driving apparatus or a capacitive touch panel driving apparatus are being practically used.

FIG. 1 is a diagram for describing a capacitive touch panel driving apparatus of the related art.

Referring to FIG. 1, a capacitive touch panel driving apparatus of the related art includes a touch panel 10 that has a sensing capacitor Cs disposed on a transmitting line Tx and a receiving line Rx, an amplifier 20 that amplifies and outputs a sensing voltage Vsen based on the capacitance change of the sensing capacitor Cs, and a converter 30 that converts an output voltage Vo, outputted from the amplifier 20, into digital touch information DTI.

The amplifier 20 includes an inverting terminal (−) connected to the receiving line Rx, and a non-inverting terminal (+) for receiving a reference voltage signal Vref. A feedback capacitor Cf is connected between the inverting terminal (−) and output terminal (To) of the amplifier 20. The amplifier 20 amplifies the sensing voltage Vsen, based on the capacitance change of the sensing capacitor Cs, at a size rate of the feedback capacitor Cf and sensing capacitor Cs and supplies the amplified voltage to the converter 30.

The capacitive touch panel driving apparatus of the related art applies an excitation signal to the transmitting line Tx of the touch panel 10, amplifies the sensing voltage Vsen based on the capacitance change of the sensing capacitor Cs when the reference voltage signal Vref has been applied to the non-inverting terminal (+) of the amplifier 20, and converts the sensing voltage Vsen into the digital touch information DTI. Therefore, the capacitive touch panel driving apparatus of the related art detects whether the touch panel 10 is touched or a touched point, on the basis of the digital touch information DTI that is generated by touch of the touch panel 10. In this case, the output voltage Vo of the amplifier 20 is determined as expressed in Equation (1) below.

$$Vo = Vref - \frac{Cs + \Delta Cs}{Cf} \times Vex \qquad (1)$$

where Cs denotes an initial sensing capacitance, and ΔCs denotes a changed sensing capacitance based on a touch motion.

However, in the touch panel driving apparatus of the related art, the capacitance of the sensing capacitor Cs is less than that of a parasitic capacitor on each line formed in the touch panel 10 and moreover a changed sensing capacitance based on a touch motion is small, thereby decreasing the change of the output voltage Vo. That is, in the touch panel driving apparatus of the related art, as expressed in Equation (1), the output voltage Vo of the amplifier 20 is proportional to the changed sensing capacitance and a voltage of the excitation signal Vex. Therefore, the voltage of the excitation signal Vex is required to increase for increasing the output voltage Vo of the amplifier 20. However, when increasing the voltage of the excitation signal Vex, since a changed sensing capacitance "ΔCs" based on a touch motion is greater than an initially changed sensing capacitance, a voltage saturation occurs where the output voltage Vo of the amplifier 20 is out of the input voltage range of the converter 30.

Therefore, in the touch panel driving apparatus of the related art, the change width of the output voltage Vo of the amplifier 20 is narrow and thus sensing sensitivity is low. Due to this reason, it is difficult for the touch panel driving apparatus to determine whether the touch panel 10 is touched.

SUMMARY

Accordingly, the present invention is directed to provide a touch panel driving apparatus and a display device including the same that substantially obviate one or more problems due to limitations and disadvantages of the related art.

The present invention is directed to provide a touch panel driving apparatus and a display device including the same, which lead to the enhancement of sensing sensitivity.

The present invention is also directed to provide a touch panel driving apparatus and a display device including the same, which allow a touch panel to be touched by a mutual capacitive scheme or a self-capacitive scheme with one sensing circuit, thus leading to the enhancement of sensing sensitivity.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a touch panel driving apparatus including: a touch control unit generating a sensing control signal corresponding to a first or second sensing mode, and generating touch point information on the basis of input digital touch information, the first or second sensing mode being set for a touch panel which includes a plurality of intersected transmitting lines and receiving lines; and a touch sensing unit connected to the receiving lines, and generating the digital touch information on the basis of change of a capacitance between two transmitting lines and one receiving line or generating the digital touch information on the basis of change of a capacitance of each of the receiving lines to supply the digital touch information to the touch control unit, according to the sensing control signal.

In the first sensing mode, the capacitance between the two transmitting lines and one receiving line may be changed by mutually inverted first and second excitation signals which are alternately applied to the two transmitting lines.

The touch sensing unit may include: a control signal generator generating a reset control signal and mutually inverted first and second switching control signals which respectively correspond to a reset section, sensing section, and digital conversion section of a line sensing period on the basis of the sensing control signal based on the first sensing mode; an excitation signal supplier generating the mutually inverted first and second excitation signals on the basis of the sensing control signal based on the first sensing mode; a sensing circuit unit including a plurality of sensing circuits which generate mutually inverted first and second differential amplification signals on the basis of the change of the capacitance between the two transmitting lines and one receiving line based on the first and second excitation signals, in response to the reset control signal and mutually inverted first and second switching control signals; a multiplexer selectively outputting the first and second differential amplification signals supplied from the sensing circuits, according to a channel selection signal of the touch control unit; and a converter converting the first and second differential amplification signals, outputted from the multiplexer, into the digital touch information to supply the digital touch information to the touch control unit.

The touch sensing unit may include: a control signal generator generating a reset control signal and mutually inverted first and second switching control signals which respectively correspond to a reset section, sensing section, and digital conversion section of a line sensing period on the basis of the sensing control signal based on the second sensing mode; an excitation signal supplier generating an excitation signal on the basis of the sensing control signal based on the second sensing mode; a sensing circuit unit including a plurality of sensing circuits which generate mutually inverted first and second differential amplification signals according to the capacitance change of the receiving line based on the excitation signal, in response to the reset control signal and mutually inverted first and second switching control signals; a multiplexer selectively outputting the first and second differential amplification signals supplied from the sensing circuits, according to a channel selection signal of the touch control unit; and a converter converting the first and second differential amplification signals, outputted from the multiplexer, into the digital touch information to supply the digital touch information to the touch control unit.

In another aspect of the present invention, there is provided an a touch panel driving apparatus, which includes a sensing circuit which generates a touch signal on the basis of capacitance change of a receiving line when a touch panel is touched, including: a first input terminal connected to one receiving line which intersects two transmitting lines receiving mutually inverted first and second excitation signals; a second input terminal receiving a reference voltage signal; a node connector connecting the first input terminal to one of first and second output nodes and connecting the second input terminal to the other output node, in response to a switching control signal corresponding to a reset section, sensing section, and digital conversion section of a line sensing period; and a differential amplifier initialized during the reset section according to the reset control signal, and generating the touch signal which includes mutually inverted first and second differential amplification signals according to an input signal which is selectively inputted to an inverting input terminal and a non-inverting input terminal through the node connector, during the sensing section and digital conversion section.

In another aspect of the present invention, there is provided a touch panel driving apparatus which includes a sensing circuit which generates a touch signal on the basis of capacitance change of a receiving line when a touch panel is touched. The sensing circuit includes: a first input terminal connected to one receiving line; a second input terminal receiving an excitation signal; a node connector connecting the first input terminal to one of first and second output nodes and connecting the second input terminal to the other output node, in response to a switching control signal corresponding to a reset section, sensing section, and digital conversion section of a line sensing period; and a differential amplifier initialized during the reset section according to the reset control signal, and generating the touch signal which includes mutually inverted first and second differential amplification signals according to an input signal which is selectively inputted to an inverting input terminal and a non-inverting input terminal through the node connector, during the sensing section and digital conversion section.

In another aspect of the present invention, there is provided a display device including: a display panel; a display panel driver displaying an image on the display panel; a touch panel disposed on the display panel or formed inside the display panel; and a touch panel driving apparatus driving the touch panel, wherein the touch panel driving apparatus includes: a touch control unit generating a sensing control signal corresponding to a first or second sensing mode, and generating touch point information on the basis of input digital touch information, the first or second sensing mode being set for a touch panel which includes a plurality of intersected transmitting lines and receiving lines; and a touch sensing unit connected to the receiving lines, generating the digital touch information on the basis of change of a capacitance between two transmitting lines and one receiving line or generating the digital touch information on the basis of change of a capacitance of each of the receiving lines to supply the digital touch information to the touch control unit, according to the sensing control signal.

The touch control unit may generate a touch sync signal which is synchronized with a source output enable signal for displaying an image by horizontal line unit of the display panel, and drive the touch sensing unit after about 5 μs elapses from a falling edge point of the touch sync signal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, a touch panel driving apparatus and a display device including the same according to embodiments of the present invention will be described in detail with reference to the accompanying drawings.

Figure 1:
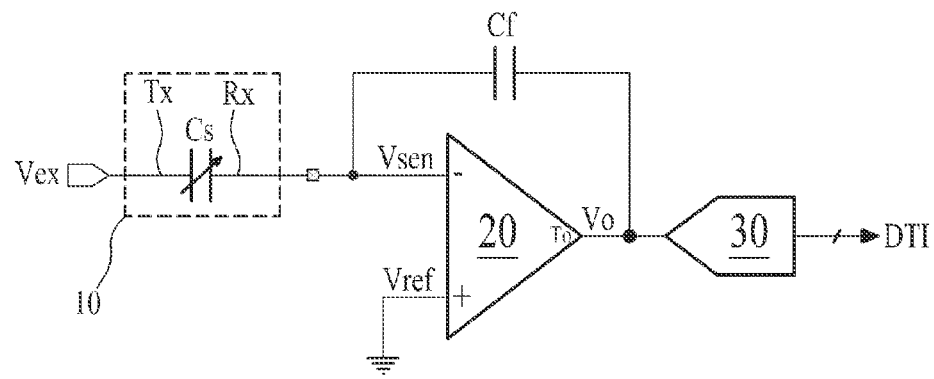
FIG. 1 is a diagram for describing a capacitive touch panel driving apparatus of the related art.
Figure 2:
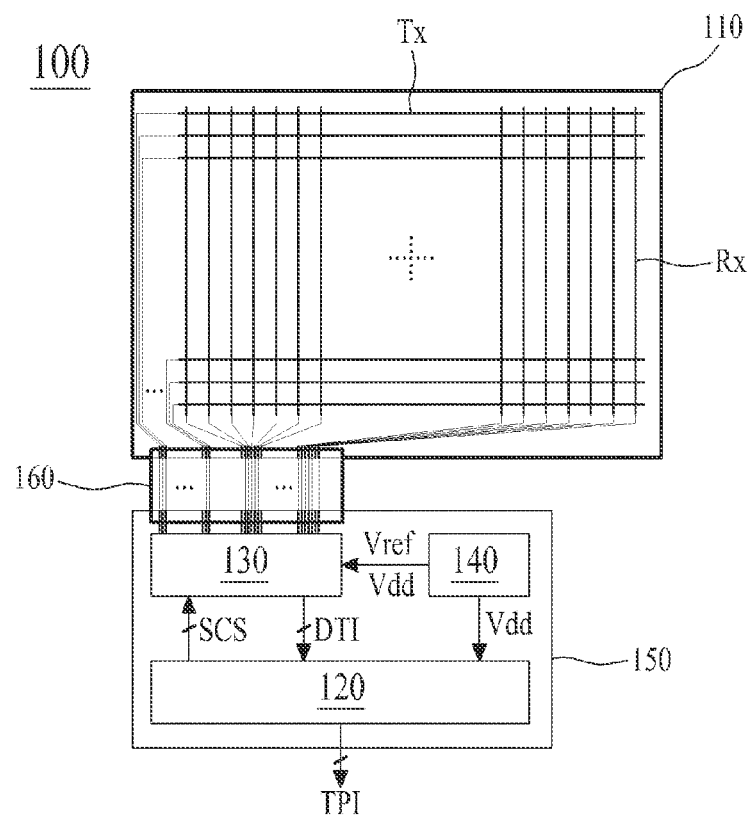
FIG. 2 is a diagram for describing a touch panel driving apparatus according to an embodiment of the present invention.

FIG. 2 is a diagram for describing a touch panel driving apparatus according to an embodiment of the present invention.

Referring to FIG. 2, a touch panel driving apparatus 100 according to an embodiment of the present invention includes a touch panel 110, a touch control unit 120, a touch sensing unit 130, and a power supply unit 140.

The touch panel 110 includes a plurality of transmitting lines Tx and a plurality of receiving lines Rx.

The transmitting lines Tx are arranged at certain intervals in parallel to a first direction of the touch panel 110.

The receiving lines Rx are arranged at certain intervals to intersect the transmitting lines Tx.

A sensing capacitance is formed between each transmitting line Tx and each receiving line Rx. The sensing capacitance is changed by user's touching the touch panel 110, and the changed sensing capacitance is supplied to the touch sensing unit 130 through each receiving line Rx.

The touch control unit 120, touch sensing unit 130, and power supply unit 140 are mounted on a touch driving board 150. Furthermore, the touch driving board 150 and touch panel 110 are electrically connected to each other through a connection member 160. The connection member 160 may be a signal cable or a flexible circuit film.

The touch control unit 120, touch sensing unit 130, and power supply unit 140 may also be mounted on a panel driving board (not shown) of a display device.

The touch control unit 120 controls the driving of the touch sensing unit 130, generates touch point information TPI on the basis of digital touch information DTI inputted from the touch sensing unit 130, and supplies the touch point information TPI to a control unit of a system (not shown). Herein, the control unit may be a Central Processing Unit (CPU) of each of various multimedia devices (for example, notebook computers, portable phones, smart phones, tablet personal computers, etc.) or a timing control unit of each of various display devices (for example, monitors, televisions, etc.).

The touch control unit 120 generates a sensing control signal SCS for controlling the driving timing of the touch sensing unit 130 and supplies the sensing control signal SCS to the touch sensing unit 130, according to a first or second sensing mode that are set. Herein, the first sensing mode may be a mutual capacitive scheme, and the second sensing mode may be a self-capacitive scheme. Therefore, the touch sensing unit 130 senses the touch of the touch panel 110 by operating in the mutual capacitive scheme or the self-capacitive scheme, according to the sensing control signal SCS.

The power supply unit 140 generates various powers that include a driving power Vdd and reference voltage signal Vref necessary for driving of the touch panel 110, and supplies the generated powers to the touch control unit 120 and touch sensing unit 130.

Figure 3:
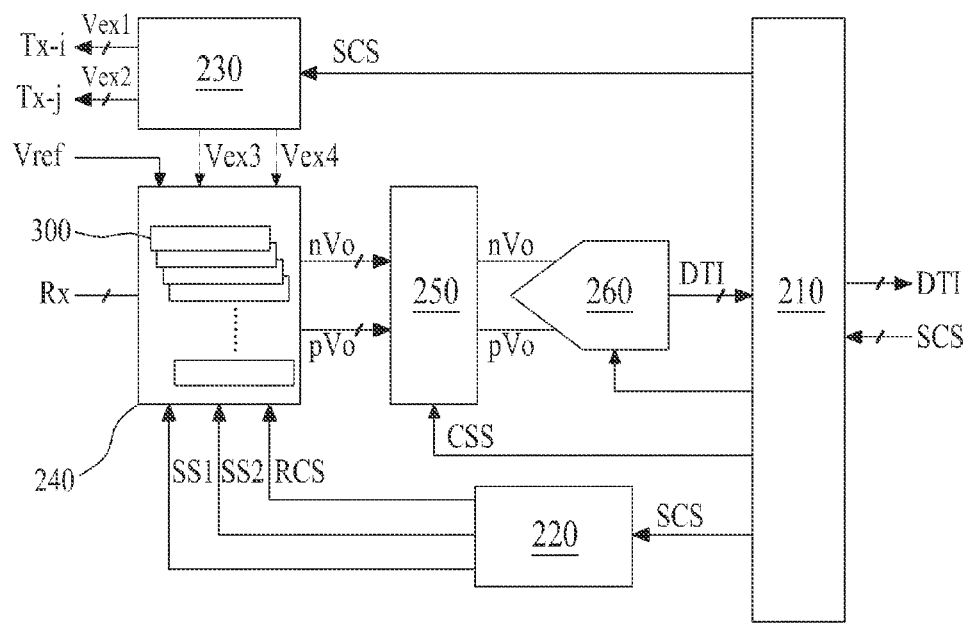
FIG. 3 is a diagram for describing a touch sensing unit of FIG. 2.

The touch sensing unit 130 is electrically connected to the transmitting lines Tx and receiving lines Rx of the touch panel 110 through the connection member 160. The touch sensing unit 130 operates in the mutual capacitive scheme for generating a touch signal with two transmitting lines Tx and one receiving line Rx according to the sensing control signal SCS, or operates in the self-capacitive scheme for generating a touch signal with one transmitting line Tx and one receiving line Rx according to the sensing control signal SCS, thereby sensing the touch of the touch panel 110. For this end, as illustrated in FIG. 3, the touch sensing unit 130 includes an interface 210, a control signal generator 220, an excitation signal supplier 230, a sensing circuit unit 240, a multiplexer 250, and a converter 260.

The interface 210 performs data communication between the touch control unit 120 and touch sensing unit 130.

The control signal generator 220 generates a reset control signal RCS and first and second switching control signals SS1 and SS2 by line sensing period unit for sensing the touch of each receiving line Rx and supplies the generated signals to the sensing circuit unit 240, according to the sensing control signal SCS that are supplied through the interface 210.

Figure 4A:
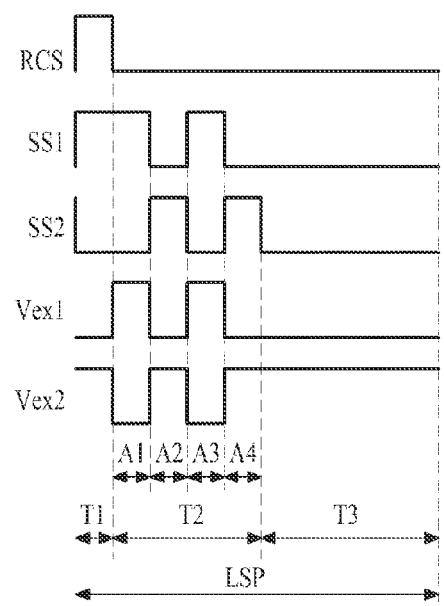
FIGS. 4A and 4B are diagrams for describing a control signal and excitation signal based on a mutual capacitive sensing mode, in the touch panel driving apparatus according to an embodiment of the present invention.
Figure 4B:
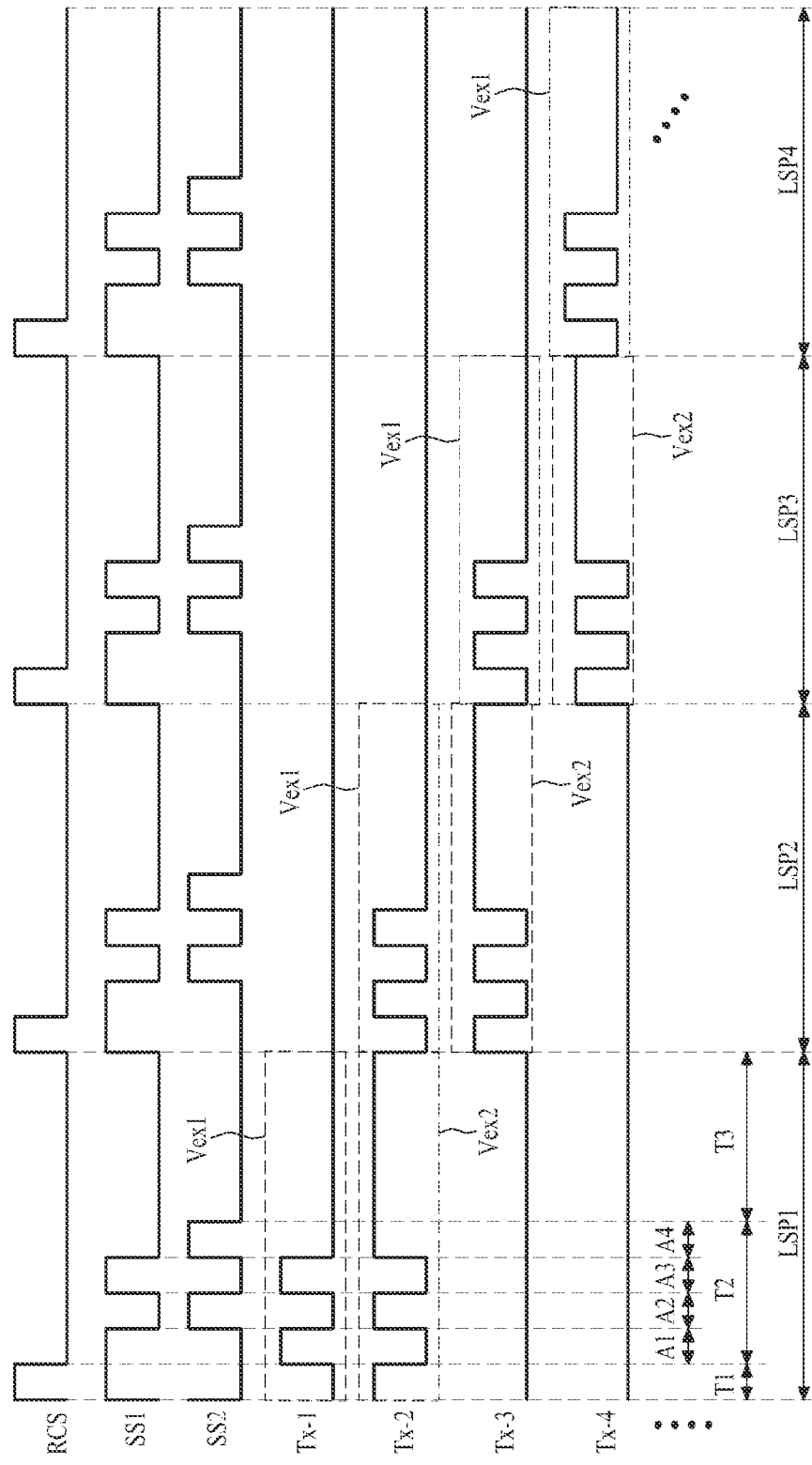

Specifically, in the first sensing mode based on the mutual capacitive scheme conforming to the sensing control signal SCS, as shown in FIG. 4A or 4B, the control signal generator 220 generates the reset control signal RCS and the mutually inverted first and second switching control signals SS1 and SS2 during a line sensing period LSP that includes a reset section T1, a sensing section T2, and a digital conversion section T3. Herein, the sensing section T2 includes first to fourth integration sections A1 to A4.

The reset control signal RCS based on the first sensing mode has a logical high level only during the reset section T1 of each line sensing period LSP, and has a logical low level during sections other than the reset section T1. The reset control signal RCS has a logical high level and initializes the sensing circuit unit 240, during the reset section T1 of each line sensing period LSP.

The first switching control signal SS1 based on the first sensing mode has a high voltage level during the reset section T1 and first and third integration sections A1 and A3, but has a low voltage level during the second and fourth integration sections A2 and A4 and digital conversion section T3.

The second switching control signal SS2 based on the first sensing mode is inverted with respect to the first switching control signal SS1.

Figure 5:
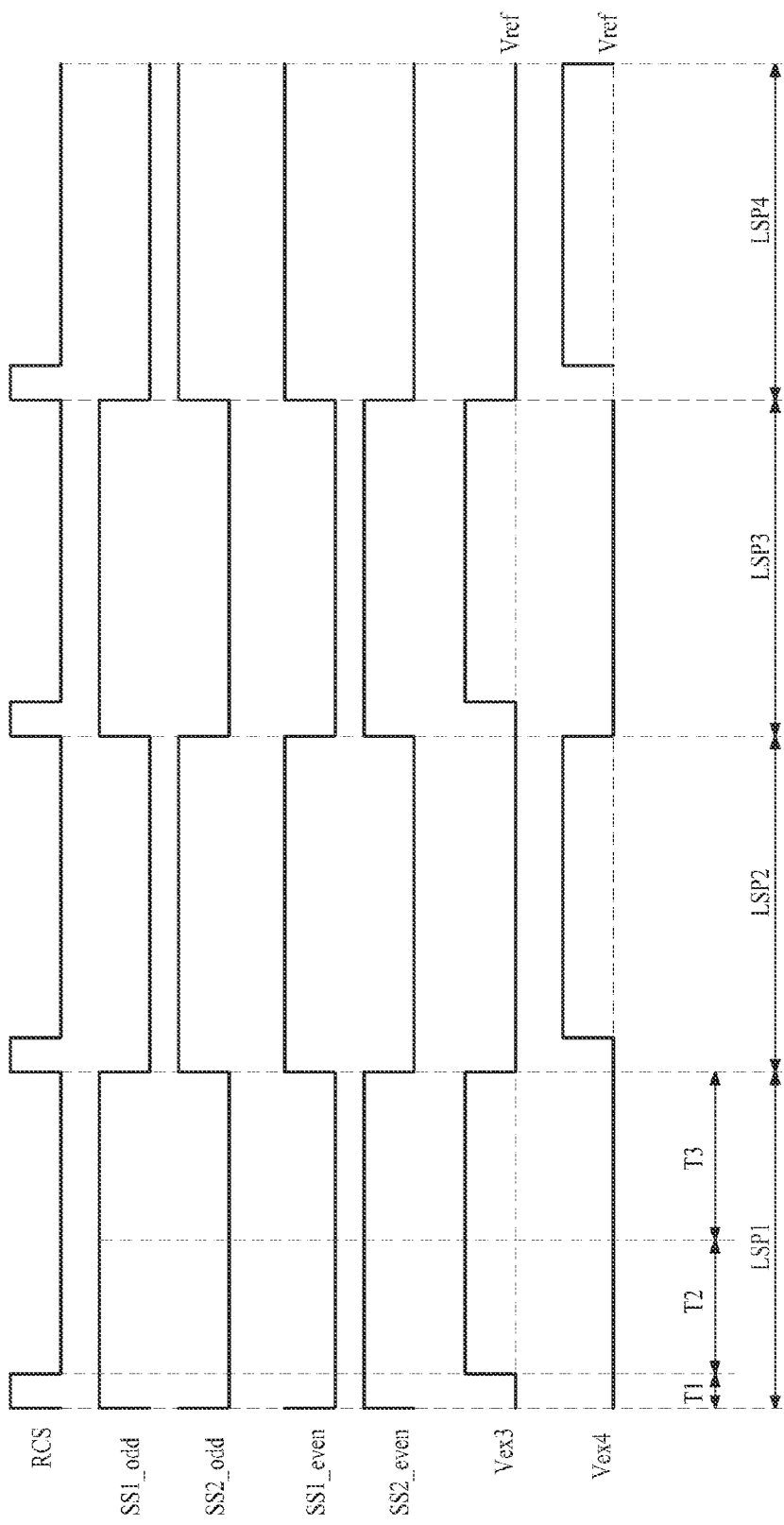
FIG. 5 is a diagram for describing a control signal and excitation signal based on a self-capacitive sensing mode, in the touch panel driving apparatus according to an embodiment of the present invention.

In the second sensing mode based on the self-capacitive scheme conforming to the sensing control signal SCS, as shown in FIG. 5, the control signal generator 220 generates the reset control signal RCS, mutually inverted first and second switching control signals SS1_odd and SS2_odd for odd channels, and mutually inverted first and second switching control signals SS1_even and SS2_even for even channels, during the line sensing period LSP that includes the reset section T1, sensing section T2, and digital conversion section T3.

The first switching control signal SS1_odd (based on the second sensing mode) for odd channels has a high voltage level during line sensing periods "LSP1, LSP3, . . . " for odd channels, but has a low voltage level during line sensing periods "LSP2, LSP4, . . . " for even channels.

The second switching control signal SS2_odd (based on the second sensing mode) for odd channels is inverted with respect to the first switching control signal SS1_odd for odd channels.

The first switching control signal SS1_even (based on the second sensing mode) for even channels has a high voltage level during line sensing periods "LSP2, LSP4, . . . " for even channels, but has a low voltage level during line sensing periods "LSP1, LSP3, . . . " for odd channels.

The second switching control signal SS2_even (based on the second sensing mode) for even channels is inverted with respect to the first switching control signal SS1_even for even channels.

In an embodiment, the excitation signal supplier 230 supplies mutually inverted first and second excitation signals Vex1 and Vex2 to two transmitting lines, namely, first and second transmitting lines Tx-i and Tx-j in the first sensing mode based on the mutual capacitive scheme conforming to the sensing control signal SCS.

The first and second transmitting lines Tx-i and Tx-j may be adjacent to each other and separated from each other by a k number (where k is a natural number from one to ten). For example, when the first transmitting line Tx-i is a first transmitting line of the transmitting lines, the second transmitting line Tx-j may be a second transmitting line or i+kth transmitting line of the transmitting lines. When the number of transmitting lines is n number and the first transmitting line Tx-i is an nth line, the second transmitting line Tx-j may be an n–kth transmitting line.

The first excitation signal Vex1, as shown in FIG. 4A, includes a low voltage section overlapping with the reset section T1 and digital conversion section T3 of the line sensing period LSP, and a voltage inversion section which overlaps with the sensing section T2 and in which a high voltage and a low voltage are alternately inverted with respect to each other. Herein, the voltage inversion section of the first excitation signal Vex1 includes a high voltage section overlapping with the first integration section A1 of the sensing section T2, a low voltage section overlapping with the second integration section A2 of the sensing section T2, a high voltage section overlapping with the third integration section A3 of the sensing section T2, and a low voltage section overlapping with the fourth integration section A4 of the sensing section T2. The first excitation signal Vex1 is supplied to the first transmitting line Tx-i, more specifically, sequentially supplied to the plurality of transmitting lines Tx by line sensing period LSP unit.

The second excitation signal Vex2, as shown in FIG. 4A, is inverted with respect to the first excitation signal Vex1. The second excitation signal Vex2 is supplied to the second transmitting line Tx-j, more specifically, sequentially supplied to the plurality of transmitting lines Tx to be inverted with respect to the first excitation signal Vex1 by line sensing period LSP unit.

The voltage swing width of each of the first and second excitation signals Vex1 and Vex2 are the same as that of a power source voltage, namely, the first and second excitation signals Vex1 and Vex2 full swing in the same size as that of the power source voltage.

In the first sensing mode based on the mutual capacitive scheme, the excitation signal supplier 230 supplies the first and second excitation signals Vex1 and Vex2 to two transmitting lines, in which case shift is performed by one transmitting line unit. Therefore, the first and second excitation signals Vex1 and Vex2 are sequentially supplied to one transmitting line during 2 line sensing period LSP. In this case, the first excitation signal Vex1 is supplied during a first line sensing period of the 2 line sensing period LSP, and the second excitation signal Vex2 is supplied during a second line sensing period of the 2 line sensing period LSP. Accordingly, as shown in FIG. 4B, in the first sensing mode, the mutually inverted first and second excitation signals Vex1 and Vex2 are supplied to two adjacent transmitting lines "Tx-1 and Tx-2, Tx-2 and Tx-3, Tx-3 and Tx-4, . . . " per line sensing period "LSP1, LSP2, LSP3, LSP4, . . . ".

In another embodiment, as shown in FIG. 5, the excitation signal supplier 230 supplies different third and fourth excitation signals Vex3 and Vex4 to the sensing circuit unit 240, in the second sensing mode based on the self-capacitive scheme conforming to the sensing control signal SCS.

The third excitation signal Vex3 has a high voltage level only during the sensing section T2 and digital conversion section T3 of an odd-numbered line sensing period "LSP1, LSP3, . . . ", and has a low voltage level during the other sections.

The fourth excitation signal Vex4 has a high voltage level only during the sensing section T2 and digital conversion section T3 of an even-numbered line sensing period "LSP2, LSP4, . . . ", and has a low voltage level during the other sections.

The low voltage level of each of the third and fourth excitation signals Vex3 and Vex4 is the same as that of the reference voltage signal Vref, and the high voltage level of each of the third and fourth excitation signals Vex3 and Vex4 is higher than that of the reference voltage signal Vref.

In FIG. 3 again, the sensing circuit unit 240 senses the touch of the touch panel 110 in response to the reset control signal RCS and first and second switching control signals SS1 and SS2 based on a sensing mode. For this end, the sensing circuit unit 240 includes a plurality of sensing circuits 300 that are connected to the plurality of receiving lines Rx to form a sensing channel.

Figure 6:
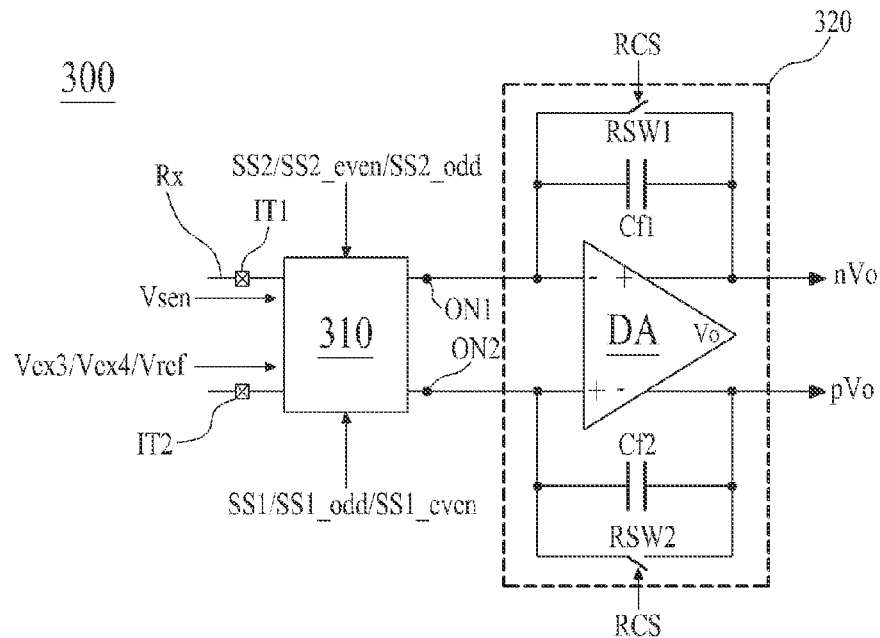
FIG. 6 is a diagram for describing a sensing circuit of a sensing circuit unit of FIG. 3.

Each of the sensing circuits 300, as illustrated in FIG. 6, includes a first input terminal IT1, a second input terminal IT2, a node connector 310, and a differential amplifier unit 320.

The first input terminal IT1 is connected to a receiving line Rx. The first input terminal IT1 receives a sensing signal Vsen based on the capacitance change of the receiving line Rx.

The second input terminal IT2 is connected to an external reference voltage source or the excitation signal supplier 230. The reference voltage signal Vref, third excitation signal Vex3, or fourth excitation signal Vex4 is supplied to the second input terminal IT2 according to a sensing mode. Specifically, in the first sensing mode based on the mutual capacitive scheme, the reference voltage signal Vref is supplied to the second input terminal IT2. In the second sensing mode based on the self-capacitive scheme, the third or fourth excitation signal Vex3/Vex4 based on the second sensing mode is supplied to the second input terminal IT2. At this point, when the sensing circuit 300 is connected to an odd-numbered receiving line, the third excitation signal Vex3 is supplied to the second input terminal IT2, or when the sensing circuit 300 is connected to an even-numbered receiving line, the fourth excitation signal Vex4 is supplied to the second input terminal IT2.

The node connector 310 connects the first input terminal IT1 to one of first and second output nodes ON1 and ON2 and connects the second input terminal IT2 to the other output node ON1/ON2, in response to the first and second switching control signals "SS1 and SS2, SS1_odd and SS2_odd, or SS1_even and SS2_even" that are supplied from the control signal generator 220 according to a sensing mode.

Figure 7A:
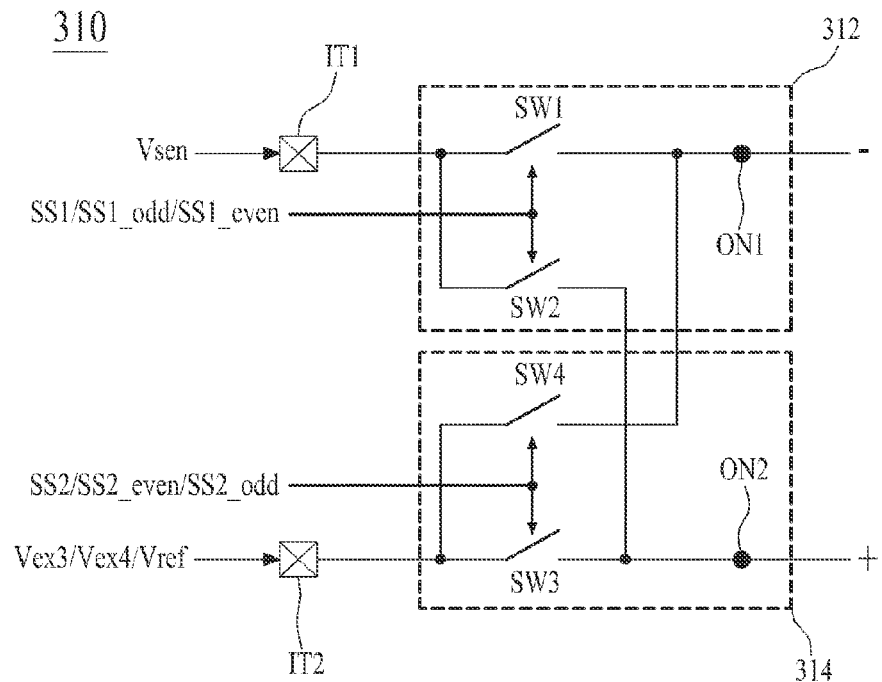
FIG. 7A is a diagram for describing an embodiment of a node connector of FIG. 6.

The node connector 310 according to an embodiment, as illustrated in FIG. 7A, includes first and second switching units 312 and 314.

The first switching unit 312 connects the first input terminal IT1 to the first or second output node ON1/ON2 according to the first switching control signal SS1/SS1_odd/SS1_even. That is, the first switching unit 312 connects the first input terminal IT1 to the first output node ON1 according to the high voltage level of the first switching control signal SS1/SS1_odd/SS1_even, or connects the first input terminal IT1 to the second output node ON2 according to the low voltage level of the first switching control signal SS1/SS1_odd/SS1_even. For this end, the first switching unit 312 includes first and second switches SW1 and SW2.

The first switch SW1 is connected between the first input terminal IT1 and the first output node ON1 and turned on according to the high voltage level of the first switching control signal SS1/SS1_odd/SS1_even, thereby connecting the first input terminal IT1 to the first output node ON1. Herein, the first switch SW1 may be an N-type transistor.

The second switch SW2 is connected between the first input terminal IT1 and the second output node ON2 and turned on according to the low voltage level of the first switching control signal SS1/SS1_odd/SS1_even, thereby connecting the first input terminal IT1 to the second output node ON2. Herein, the second switch SW2 may be a P-type transistor.

The second switching unit 314 connects the second input terminal IT2 to the second or first output node ON2/ON1 according to the second switching control signal SS2/SS2_odd/SS2_even. That is, the second switching unit 314 connects the second input terminal IT2 to the second output node ON2 according to the high voltage level of the second switching control signal SS2/SS2_odd/SS2_even, or connects the second input terminal IT2 to the first output node ON1 according to the low voltage level of the second switching control signal SS2/SS2_odd/SS2_even. For this end, the second switching unit 314 includes third and fourth switches SW3 and SW4.

The third switch SW3 is connected between the second input terminal IT2 and the second output node ON2 and turned on according to the high voltage level of the second switching control signal SS2/SS2_odd/SS2_even, thereby connecting the second input terminal IT2 to the second output node ON2. Herein, the third switch SW3 may be an N-type transistor.

The fourth switch SW4 is connected between the second input terminal IT2 and the first output node ON1 and turned on according to the low voltage level of the second switching control signal SS2/SS2_odd/SS2_even, thereby connecting the second input terminal IT2 to the first output node ON1. Herein, the fourth switch SW4 may be a P-type transistor.

Figure 7B:
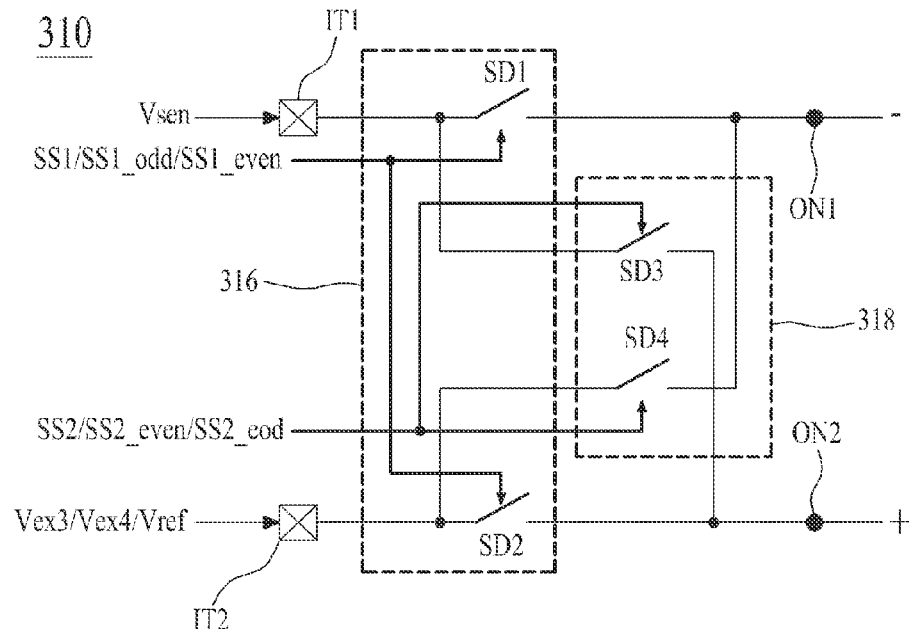
FIG. 7B is a diagram for describing another embodiment of the node connector of FIG. 6.

A node connector 310 according to another embodiment, as illustrated in FIG. 7B, includes first and second switching units 316 and 318.

The first switching unit 316 connects a first input terminal IT1 to a first output node ON1 and connects a second input terminal IT2 to a second output node ON2, according to the high voltage level of the first switching control signal SS1/SS1_odd/SS1_even. For this end, the first switching unit 316 includes first and second switching elements SD1 and SD2.

The first switching element SD1 is connected between the first input terminal IT1 and the first output node ON1 and turned on according to the high voltage level of the first switching control signal SS1/SS1_odd/SS1_even, thereby connecting the first input terminal IT1 to the first output node ON1. Herein, the first switching element SD1 may be an N-type transistor.

The second switching element SD2 is connected between the second input terminal IT2 and the second output node ON2 and turned on according to the high voltage level of the first switching control signal SS1/SS1_odd/SS1_even, thereby connecting the second input terminal IT2 to the second output node ON2. Herein, the second switching element SD2 may be an N-type transistor.

The second switching unit 318 connects the first input terminal IT1 to the second output node ON2 and connects the second input terminal IT2 to the first output node ON1, according to the high voltage level of the second switching control signal SS2/SS2_odd/SS2_even. For this end, the second switching unit 318 includes third and fourth switching elements SD3 and SD4.

The third switching element SD3 is connected between the first input terminal IT1 and the second output node ON2 and turned on according to the high voltage level of the second switching control signal SS2/SS2_odd/SS2_even, thereby connecting the first input terminal IT1 to the second output node ON2. Herein, the third switching element SD3 may be an N-type transistor.

The fourth switching element SD4 is connected between the second input terminal IT2 and the first output node ON1 and turned on according to the high voltage level of the second switching control signal SS2/SS2_odd/SS2_even, thereby connecting the second input terminal IT2 to the first output node ON1. Herein, the fourth switching element SD4 may be an N-type transistor.

The node connector 310 selectively changes a path of a signal, outputted from two input terminals IT1 and IT2 to two output nodes ON1 and ON2, by switching the first and second switching units "312 and 314" and "316 and 318" controlled by the first and second switching control signals "SS1 and SS2, SS1_odd and SS2_odd, and SS1_even and SS2_even" having each line sensing period "LSP1, LSP2, . . . " based on the sensing mode of FIG. 4B or 5.

Specifically, an operation of the node connector 310 in the first sensing mode based on the mutual capacitive scheme will be described below with reference to FIGS. 4A and 6.

The node connector 310 connects the first input terminal IT1, receiving the sensing signal Vsen based on the first and second excitation signals Vex1 and Vex2, to the first output node ON1 and simultaneously connects the second input terminal IT2, receiving the reference voltage signal Vref, to the second output node ON2, during the reset section T1 of each line sensing period "LSP1, LSP2, . . . ". Also, the node connector 310 alternately connects the first input terminal IT1 receiving the sensing signal Vsen and the second input terminal IT2 receiving the reference voltage signal Vref to the first and second output nodes ON1 and ON2 during the sensing section T2. Furthermore, the node connector 310 connects the first input terminal IT1 receiving the sensing signal Vsen to the second output node ON2 and simultaneously connects the second input terminal IT2 receiving the reference voltage signal Vref to the first output node ON1, during the digital conversion section T3

An operation of the node connector 310 in the second sensing mode based on the self-capacitive scheme will be described below with reference to FIGS. 5 and 6.

The node connector 310 connects the first input terminal IT1 to the first output node ON1 and simultaneously connects the second input terminal IT2 to the second output node ON2, according to the first and second switching control signals "SS1_odd and SS2_odd" and "SS1_even and SS2_even" having a high voltage level. Furthermore, the node connector 310 connects the first input terminal IT1 to the second output node ON2 and simultaneously connects the second input terminal IT2 to the first output node ON1, according to the first and second switching control signals "SS1_odd and SS2_odd" and "SS1_even and SS2_even" having a low voltage level.

In FIG. 6 again, the differential amplifier unit 320 is initialized according to the reset control signal RCS of the reset section T1, and differentially amplifies two input signals inputted through the node connector 310 to generate a touch signal that is composed of mutually inverted first and second differential amplification signals nVo and pVo. For this end, the differential amplifier unit 320 includes a differential amplifier DA, first and second feedback capacitors Cf1 and Cf2, and first and second reset switches RSW1 and RSW2.

The differential amplifier DA includes an inverting input terminal (−) connected to the first output node ON1, a non-inverting input terminal (+) connected to the second output node ON2 of the node connector 310, a non-inverting output terminal (+) for outputting the first differential amplification signal nVo, and an inverting output terminal (−) for outputting the second differential amplification signal pVo. The differential amplifier DA generates the first differential amplification signal nVo on the basis of a signal inputted to the inverting input terminal (−) and the capacitance of the first feedback capacitor Cf1, and generates the second differential amplification signal pVo that is inverted with respect to the first differential amplification signal nVp, on the basis of a signal inputted to the non-inverting input terminal (+) and the capacitance of the second feedback capacitor Cf2.

The first feedback capacitor Cf1 is connected between the inverting input terminal (−) and non-inverting output terminal (+). The first feedback capacitor Cf1 allows a gain of the first differential amplification signal nVo, outputted to the non-inverting output terminal (+) of the differential amplifier DA, to have a value within a certain range.

The second feedback capacitor Cf2 is connected between the non-inverting input terminal (+) and inverting output terminal (−). The second feedback capacitor Cf2 allows a gain of the second differential amplification signal pVo, outputted to the inverting output terminal (−) of the differential amplifier DA, to have a value within a certain range. In this case, the second feedback capacitor Cf2 may have the same capacitance as that of the first feedback capacitor Cf1.

The first reset switch RSW1 is connected between the inverting input terminal (−) and non-inverting output terminal (+) so as to be electrically connected to the first feedback Cf1 in parallel. The first reset switch RSW1 is turned on and discharges an electric charge that has been charged in the first feedback capacitor Cf1, according to the logic high level of the reset control signal RCS. Alternatively, the first reset switch RSW1 is turned off and allows the first feedback capacitor Cf1 to be charged with an electric charge, according to the logic low level of the reset control signal RCS.

The second reset switch RSW2 is connected between the non-inverting input terminal (+) and inverting output terminal (−) so as to be electrically connected to the second feedback Cf2 in parallel. The second reset switch RSW2 is turned on and discharges an electric charge that has been charged in the second feedback capacitor Cf2, according to the logic high level of the reset control signal RCS. Alternatively, the second reset switch RSW2 is turned off and allows the second feedback capacitor Cf2 to be charged with an electric charge, according to the logic low level of the reset control signal RCS.

In FIG. 3 again, the multiplexer 250 supplies the first and second differential amplification signals nVo and pVo, which are outputted from the differential amplifier unit 320 in one of the sensing circuits 300, to the converter 260 in response to the channel selection signal that is supplied from the touch control unit 120 through the interface 210.

The converter 260 generates an analog channel sensing voltage on the basis of the touch signal that is composed of the first and second differential amplification signals nVo and pVo supplied from the multiplexer 250, and converts the channel sensing voltage into the digital touch information DTI to supply the digital touch information DTI to the touch control unit 120 through the interface 210.

Figure 8:
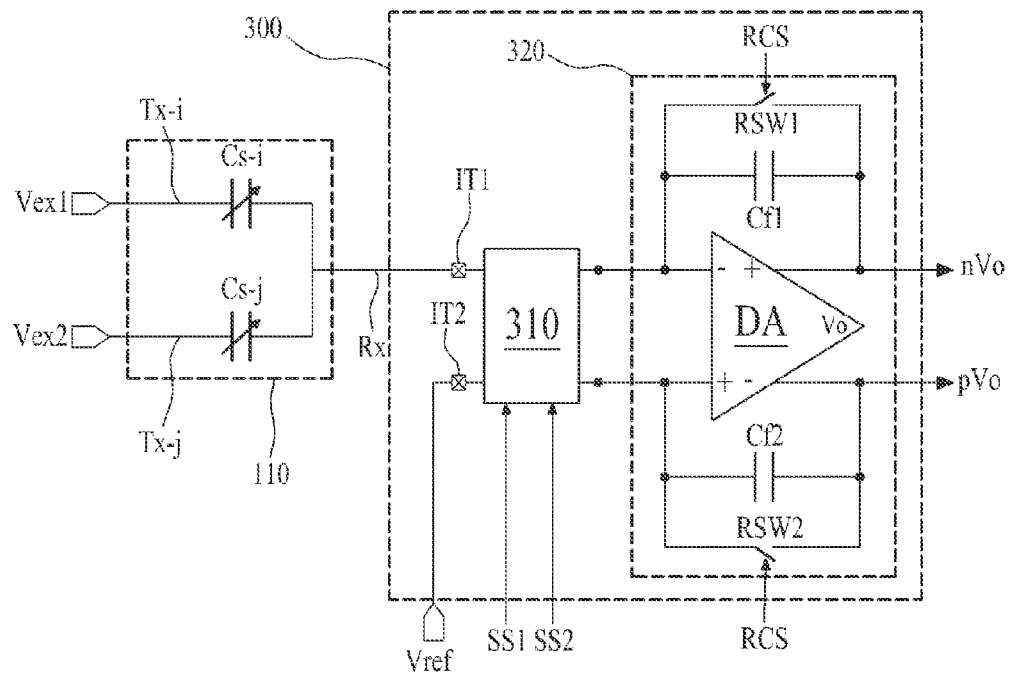
FIG. 8 is a circuit diagram for describing a mutual capacitive sensing method, in the touch panel driving apparatus according to an embodiment of the present invention.
Figure 9:
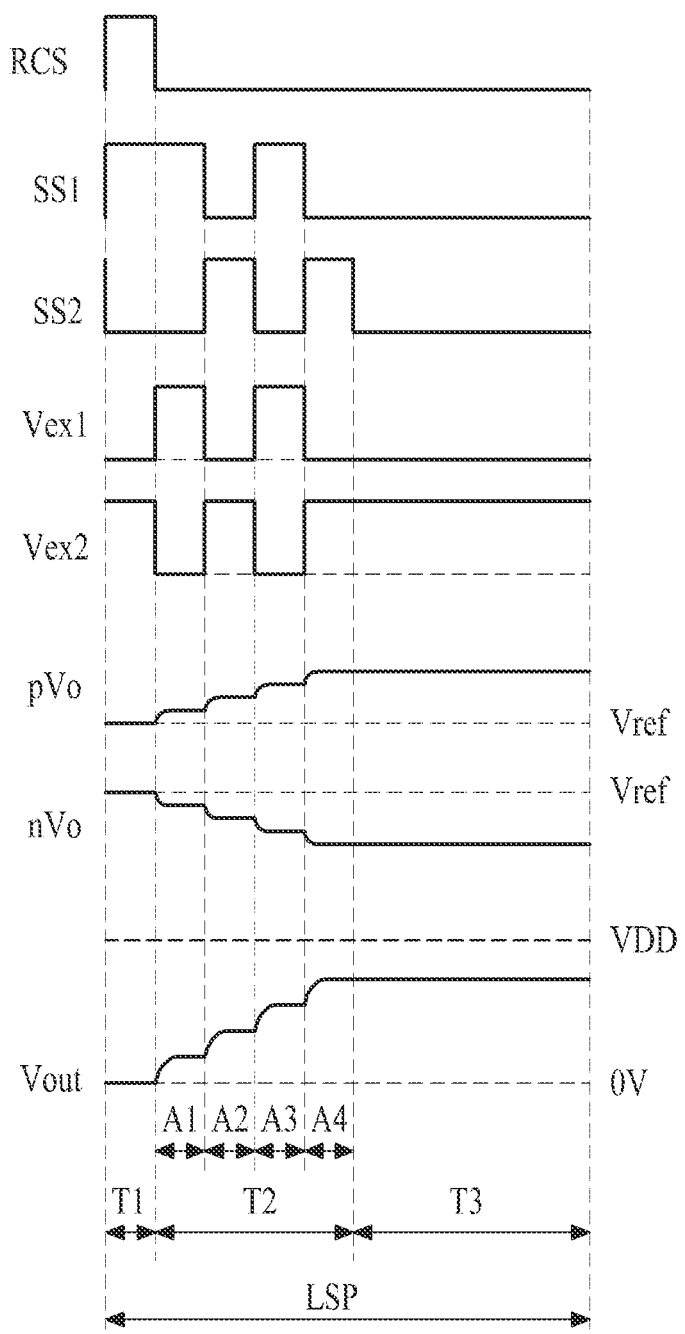
FIG. 9 is a waveform diagram for describing the mutual capacitive sensing method, in the touch panel driving apparatus according to an embodiment of the present invention.

FIG. 8 is a circuit diagram for describing a mutual capacitive sensing method, in the touch panel driving apparatus according to an embodiment of the present invention. FIG. 9 is a waveform diagram for describing the mutual capacitive sensing method, in the touch panel driving apparatus according to an embodiment of the present invention.

The following description will be made with reference to FIGS. 8 and 9 on the mutual capacitive sensing method, in the touch panel driving apparatus according to an embodiment of the present invention.

First, during the reset section T1 of the line sensing periods "LSP1, LSP2, . . . ", by switching the node connector 310 according to the first and second switching control signals SS1 and SS2, the touch panel driving apparatus connects the receiving line Rx to the inverting input terminal (−) of the differential amplifier DA and supplies the reference voltage signal Vref to the non-inverting input terminal (+) of the differential amplifier DA, according to the node connection of the node connector 310. Subsequently, the touch panel driving apparatus turns on the first and second reset switches RSW1 and RSW2 and thus discharges electric charges that have been respectively charged in the first and second feedback capacitors Cf1 and Cf2, according to the logic high level of the reset control signal RCS. Therefore, the first and second differential amplification signals nVo and pVo outputted from the differential amplifier DA have the same voltage level as that of the reference voltage signal Vref.

Subsequently, during the sensing section T2 of the line sensing periods "LSP1, LSP2, . . . ", the touch panel driving apparatus turns off the first and second switches RSW1 and RSW2 according to the logic low level of the reset control signal RCS. Furthermore, during the sensing section T2, the touch panel driving apparatus supplies the first excitation signal Vex1, which is inverted per integration sections A1 to A4 of the sensing section T2, to the first transmitting line Tx-i and supplies the second excitation signal Vex2, inverted with respect to the first excitation signal Vex1, to the second transmitting line Tx-j. Also, the touch panel driving apparatus alternately changes the inverting terminal (−) and non-inverting terminal (+) of the differential amplifier DA respectively connected to the first and second input terminals IT1 and IT2 of the node connector 310 per integration sections A1 to A4 of the sensing section T2, according to the first and second switching control signals SS1 and SS2.

The first and second transmitting lines Tx-i and Tx-j may be adjacent to each other and separated from each other by a k number (where k is a natural number from one to ten). For example, when the first transmitting line Tx-i is a first transmitting line of the transmitting lines, the second transmitting line Tx-j may be a second transmitting line or i+kth transmitting line of the transmitting lines. When the number of transmitting lines is n number and the first transmitting line Tx-i is an nth line, the second transmitting line Tx-j may be an n−kth transmitting line.

Accordingly, the sensing signal Vsen and reference voltage signal Vref from the receiving line Rx are alternately applied to the inverting input terminal (−) and non-inverting input terminal (+) of the differential amplifier DA per integration sections A1 to A4, during the sensing section T2. Therefore, the first and second differential amplification signals nVo and pVo that are outputted by a differential amplification in the differential amplifier DA may be expressed as Equation (2) below.

$$nVo = Vref - \frac{(Cs-i+\Delta Cs-i)-(Cs-j+\Delta Cs-j)}{Cf} \times \Delta Vex \qquad (2)$$

$$pVo = Vref + \frac{(Cs-i+\Delta Cs-i)-(Cs-j+\Delta Cs-j)}{Cf} \times \Delta Vex$$

where Cs-i denotes a mutual capacitance between the first transmitting line Tx-i and one receiving line Rx when the touch panel is not touched (i.e., non-touch), Cs-j denotes a mutual capacitance between the second transmitting line Tx-j and one receiving line Rx when the touch panel is not touched (i.e., non-touch), ΔCs-i denotes a changed mutual capacitance between the first transmitting line Tx-i and one receiving line Rx when the touch panel is touched (i.e., touch), and ΔCs-j denotes a changed mutual capacitance between the second transmitting line Tx-j and one receiving line Rx when the touch panel is touched (i.e., touch). Cf denotes the capacitance of the feedback capacitor, and ΔVex denotes a changed excitation signal applied to the first and second transmitting lines Tx-i and Tx-j.

When the touch panel 10 is not touched, if the mutual capacitance (Cs-i=Cs-j) of the transmitting line Tx is the same as that of the receiving line Rx, the first and second differential amplification signals nVo and pVo outputted by the differential amplification in the differential amplifier DA may be expressed as Equation (3).

$$nVo = Vref - \frac{(\Delta Cs-i)-(\Delta Cs-j)}{Cf} \times \Delta Vex \qquad (3)$$

$$pVo = Vref + \frac{(\Delta Cs-i)-(\Delta Cs-j)}{Cf} \times \Delta Vex$$

As seen in Equation (3), the differential amplifier DA generates the first and second differential amplification signals nVo and pVo with only the changed sensing capacitances ΔCs-i and ΔCs-j in a pure touch motion.

In calculating an output voltage Vout (i.e., a different between the first and second differential amplification signals nVo and pVo of the differential amplifier DA, the output voltage Vout is expressed as Equation (4) below.

$$Vout = pVo - nVo \qquad (4)$$

$$= 2 \cdot \frac{(\Delta Cs-i)-(\Delta Cs-j)}{Cf} \times \Delta Vex$$

As seen in Equations (3) and (4), the output voltage Vout of the differential amplifier DA is changed by a difference of mutual capacitances (changed by a touch) between the first and second transmitting lines Tx-i and Tx-j and one receiving line Rx, and the touch signal is sensed with a changed voltage.

The first and second differential amplification signals nVo and pVo of the differential amplifier DA are integrated and amplified by a high voltage section of the first and second excitation signals Vex1 and Vex2 that are alternately applied to the first and second transmitting lines Tx-i and Tx-j during the integration sections A1 to A4 of the sensing section T2.

Subsequently, during the digital conversion section T3, the touch panel driving apparatus supplies the first excitation signal Vex1 having a low voltage section to the first transmitting line Tx-i, and supplies the second excitation signal Vex2 having a high voltage section to the second transmitting line Tx-j. Also, the touch panel driving apparatus supplies the reference voltage signal Vref to the inverting input terminal (−) of the differential amplifier DA and connects the non-inverting terminal (+) of the differential amplifier DA to the receiving line Rx, through the node connection of the node connector 310 that is made according to the first and second switching control signals SS1 and SS2. Accordingly, the first and second differential amplification signals nVo and pVo outputted from the differential amplifier DA are maintained at a voltage level that is amplified by the first and second excitation signals Vex1 and Vex2 and first and second switching control signals SS1 and SS2 that are supplied during the digital conversion section T3. The first and second differential amplification signals nVo and pVo are selected and supplied to the converter 260 by the multiplexer 250.

The converter 260 generates an analog channel sensing voltage on the basis of the touch signal that is composed of the first and second differential amplification signals nVo and pVo supplied from the multiplexer 250, and converts the channel sensing voltage into the digital touch information DTI to supply the digital touch information DTI to the touch control unit 120 through the interface 210. Therefore, the touch control unit 120 generates the touch point information TPI on the basis of the digital touch information DTI supplied from the converter 260 and outputs the touch point information TPI to the outside.

The touch panel driving apparatus having the first sensing mode based on the mutual capacitive scheme, according to an embodiment of the present invention, removes the inherent mutual capacitance component of the touch panel with the two mutually inverted excitation signals and senses the touch of the touch panel through only the change of a sensing capacitance based on a touch motion, leading to the enhancement of touch sensitivity. The touch panel driving apparatus amplifies only a difference of sensing capacitances between two transmitting lines and one receiving line, and thus can widen a dynamic range of a sensing voltage, reduce the burden given to the converter to thereby increase the accuracy of sensing, and remove the influence of external noise to thereby enhance touch sensitivity.

Figure 10:
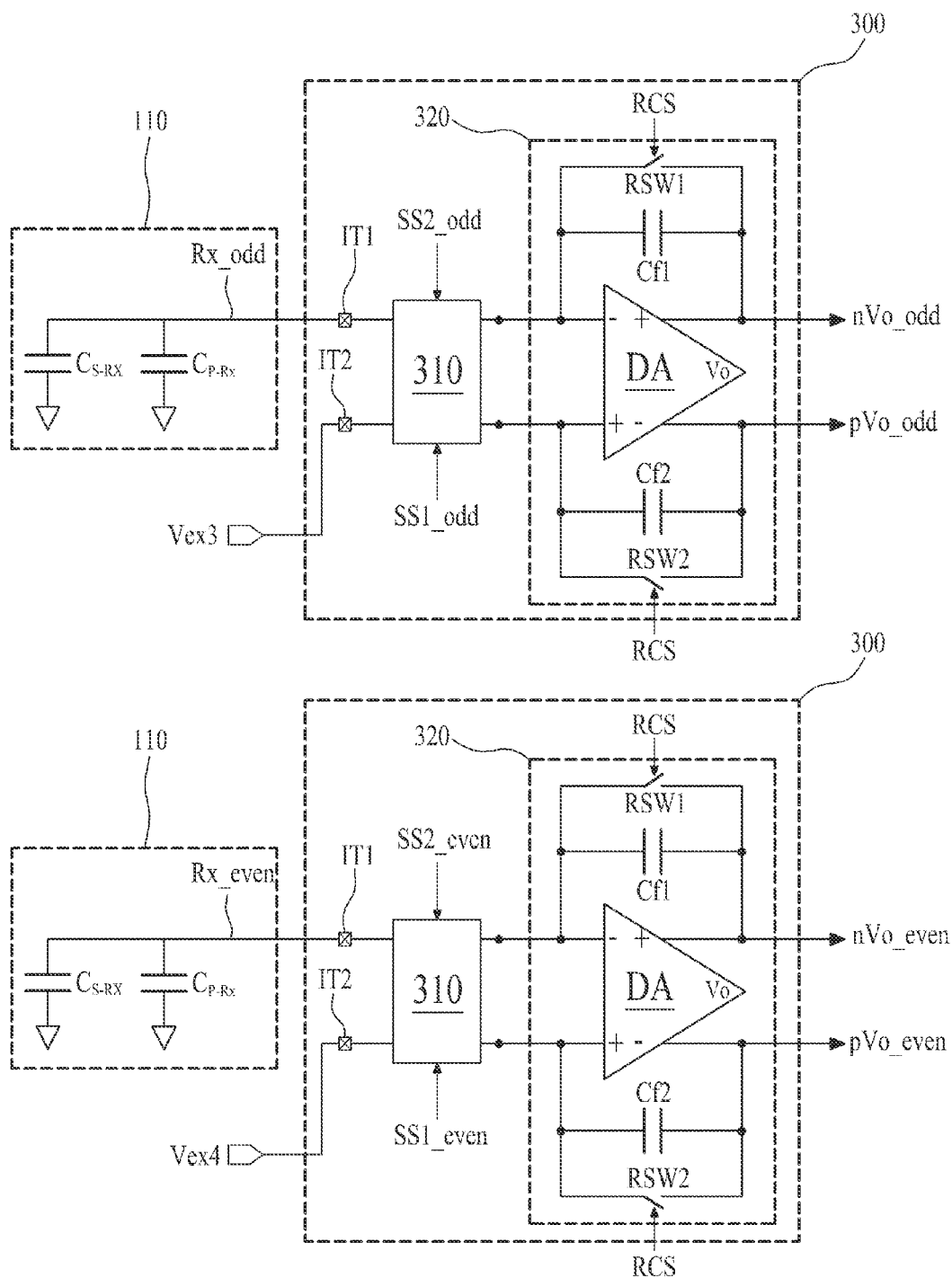
FIG. 10 is a circuit diagram for describing a self-capacitive sensing method, in the touch panel driving apparatus according to an embodiment of the present invention.
Figure 11:
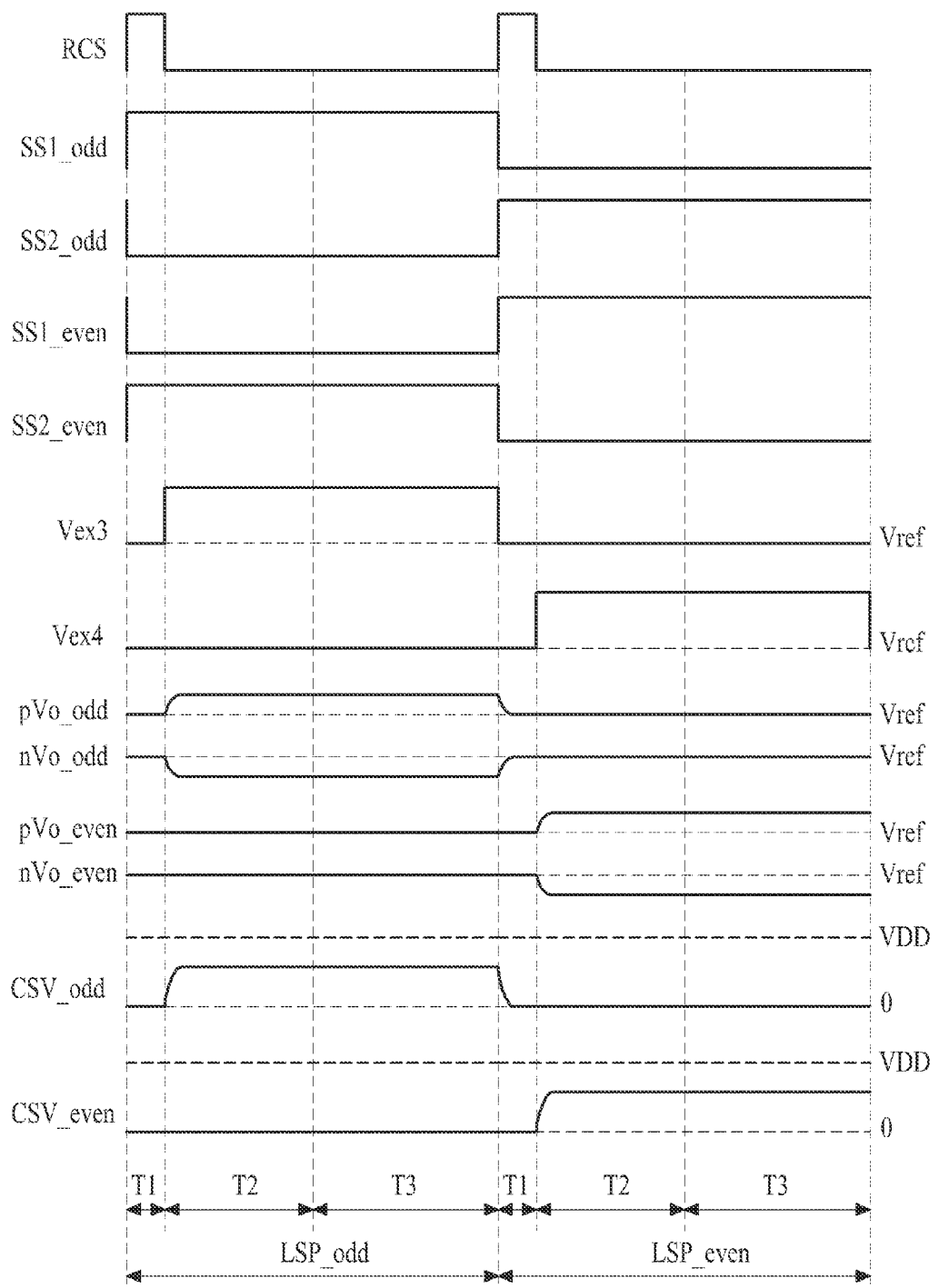
FIG. 11 is a waveform diagram for describing the self-capacitive sensing method, in the touch panel driving apparatus according to an embodiment of the present invention.

FIG. 10 is a circuit diagram for describing a self-capacitive sensing method, in the touch panel driving apparatus according to an embodiment of the present invention. FIG. 11 is a waveform diagram for describing the self-capacitive sensing method, in the touch panel driving apparatus according to an embodiment of the present invention.

The following description will be made with reference to FIGS. 10 and 11 on the self-capacitive sensing method, in the touch panel driving apparatus according to an embodiment of the present invention.

First, in an odd-numbered line sensing period LSP_odd for an odd-numbered receiving line, sensing on an odd-numbered receiving line Rx_odd is performed by an odd-numbered sensing circuit 300, but sensing on an even-numbered receiving line Rx_even is not performed by an even-numbered sensing circuit 300.

Specifically, during the reset section T1 of the odd-numbered line sensing period LSP_odd, by switching the node connector 310 of the odd-numbered sensing circuit 300, the touch panel driving apparatus connects the first input terminal IT1 of the node connector 310 to the inverting input terminal (−) of the differential amplifier DA, and connects the second input terminal IT2 of the node connector 310 to the non-inverting input terminal (+) of the differential amplifier DA, according to the first and second switching control signals SS1_odd and SS2_odd for odd channels. Subsequently, the touch panel driving apparatus turns on the first and second reset switches RSW1 and RSW2 of each differential amplifier unit 320 in the odd-numbered sensing circuit 300 and thus discharges electric charges that have been respectively charged in the first and second feedback capacitors Cf1 and Cf2, according to the logic high level of the reset control signal RCS. Therefore, the first and second differential amplification signals nVo_odd and pVo_odd outputted from each differential amplifier DA of the odd_numbered sensing circuit 300 have the same voltage level as that of the reference voltage signal Vref.

Simultaneously, during the reset section T1 of the odd-numbered line sensing period LSP_odd, by switching the node connector 310 of the even-numbered sensing circuit 300, the touch panel driving apparatus connects the first input terminal IT1 of the node connector 310 to the non-inverting input terminal (+) of the differential amplifier DA, and connects the second input terminal IT2 of the node connector 310 to the inverting input terminal (−) of the differential amplifier DA, according to the first and second switching control signals SS1_even and SS2_even for even channels. Subsequently, the touch panel driving apparatus turns on the first and second reset switches RSW1 and RSW2 of each differential amplifier unit 320 in the even-numbered sensing circuit 300 and thus discharges electric charges that have been respectively charged in the first and second feedback capacitors Cf1 and Cf2, according to the logic high level of the reset control signal RCS. Therefore, the first and second differential amplification signals nVo_even and pVo_even outputted from each differential amplifier DA of the even_numbered sensing circuit 300 have the same voltage level as that of the reference voltage signal Vref.

Subsequently, during the sensing section T2 of the odd-numbered line sensing period LSP_odd, the touch panel driving apparatus turns off the first and second switches RSW1 and RSW2 according to the logic low level of the reset control signal RCS. Furthermore, during the sensing section T2, the touch panel driving apparatus supplies the third excitation signal Vex3 having a high voltage level to the second input terminal IT2 of each node connector 310 in the odd-numbered sensing circuit 300, and simultaneously supplies the fourth excitation signal Vex4 having a low voltage level to the second input terminal IT2 of each node connector 310 in the even-numbered sensing circuit 300. Therefore, each differential amplifier DA of the odd-numbered sensing circuit 300 generates first and second differential amplification signals nVo_odd and pVo_odd of an odd channel with a voltage difference between an inverting terminal (−), connected to an odd-numbered receiving line Rx through a node connector 310, and a non-inverting terminal (+) receiving the third excitation signal Vex3 having a high voltage level through the node connector 310. However, each differential amplifier DA of the even-numbered sensing circuit 300 generates first and second differential amplification signals nVo_even and pVo_even of an even channel with a voltage difference between an inverting terminal (−), receiving the fourth excitation signal Vex4 having a low voltage level through a node connector 310, and a non-inverting terminal (+) that is connected to an even-numbered receiving line Rx through the node connector 310. The first and second differential amplification signals nVo_odd and pVo_odd of each odd channel and first and second differential amplification signals nVo_even and pVo_even of each even channel are selected and supplied to the converted 260 by the multiplexer 250.

Subsequently, during the digital conversion section T3 of the odd-numbered line sensing period LSP_odd, the converter 260 generates a channel sensing voltage CSV_odd of each odd channel on the basis of first and second differential amplification signals nVo_odd and pVo_odd of each odd channel supplied from the multiplexer 250, and simultaneously generates a channel sensing voltage CSV_even of each even channel on the basis of first and second differential amplification signals nVo_even and pVo_even of each even channel supplied from the multiplexer 250. The converter 260 converts a voltage difference between the channel sensing voltage CSV_odd of each odd channel and the channel sensing voltage CSV_even of each even channel into digital touch information DTI, and supplies the digital touch information DTI to the touch control unit 120 through the interface 210. Therefore, the touch control unit 120 generates touch point information TPI on the basis of the digital touch information DTI supplied from the converter 260 and outputs the touch point information TPI to the outside.

In an even-numbered line sensing period LSP_even for an even-numbered receiving line, sensing on an even-numbered receiving line Rx_even is performed by an even-numbered sensing circuit 300, but sensing on an odd-numbered receiving line Rx_odd is not performed by an odd-numbered sensing circuit 300.

Specifically, during the reset section T1 of the even-numbered line sensing period LSP_even, by switching the node connector 310 of the even-numbered sensing circuit 300, the touch panel driving apparatus connects the first input terminal IT1 of the node connector 310 to the inverting input terminal (−) of the differential amplifier DA, and connects the second input terminal IT2 of the node connector 310 to the non-inverting input terminal (+) of the differential amplifier DA, according to the first and second switching control signals SS1_even and SS2_even for even channels. Subsequently, the touch panel driving apparatus turns on the first and second reset switches RSW1 and RSW2 of each differential amplifier unit 320 in the even-numbered sensing circuit 300 and thus discharges electric charges that have been respectively charged in the first and second feedback capacitors Cf1 and Cf2, according to the logic high level of the reset control signal RCS. Therefore, the first and second differential amplification signals nVo_even and pVo_even outputted from each differential amplifier DA of the even_numbered sensing circuit 300 have the same voltage level as that of the reference voltage signal Vref.

Simultaneously, during the reset section T1 of the even-numbered line sensing period LSP_even, by switching the node connector 310 of the odd-numbered sensing circuit 300, the touch panel driving apparatus connects the first input terminal IT1 of the node connector 310 to the non-inverting input terminal (+) of the differential amplifier DA, and connects the second input terminal IT2 of the node connector 310 to the inverting input terminal (−) of the differential amplifier DA, according to the first and second switching control signals SS1_odd and SS2_odd for odd channels. Subsequently, the touch panel driving apparatus turns on the first and second reset switches RSW1 and RSW2 of each differential amplifier unit 320 in the odd-numbered sensing circuit 300 and thus discharges electric charges that have been respectively charged in the first and second feedback capacitors Cf1 and Cf2, according to the logic high level of the reset control signal RCS. Therefore, the first and second differential amplification signals nVo_odd and pVo_odd outputted from each differential amplifier DA of the even_numbered sensing circuit 300 have the same voltage level as that of the reference voltage signal Vref.

Subsequently, during the sensing section T2 of the even-numbered line sensing period LSP_even, the touch panel driving apparatus turns off the first and second switches RSW1 and RSW2 according to the logic low level of the reset control signal RCS. Furthermore, during the sensing section T2, the touch panel driving apparatus supplies the fourth excitation signal Vex4 having a high voltage level to the second input terminal IT2 of each node connector 310 in the even-numbered sensing circuit 300, and simultaneously supplies the third excitation signal Vex3 having a low voltage level to the second input terminal IT2 of each node connector 310 in the odd-numbered sensing circuit 300. Therefore, each differential amplifier DA of the even-numbered sensing circuit 300 generates first and second differential amplification signals nVo_even and pVo_even of each even channel with a voltage difference between an inverting terminal (−), connected to an even-numbered receiving line Rx through a node connector 310, and a non-inverting terminal (+) receiving the fourth excitation signal Vex4 having a high voltage level through the node connector 310. However, each differential amplifier DA of the odd-numbered sensing circuit 300 generates first and second differential amplification signals nVo_odd and pVo_odd of each odd channel with a voltage difference between an inverting terminal (−), receiving the third excitation signal Vex3 having a low voltage level through a node connector 310, and a non-inverting terminal (+) that is connected to an odd-numbered receiving line Rx through the node connector 310. The first and second differential amplification signals nVo_even and pVo_even of each even channel and first and second differential amplification signals nVo_odd and pVo_odd of each odd channel are selected and supplied to the converted 260 by the multiplexer 250.

Subsequently, during the digital conversion section T3 of the even-numbered line sensing period LSP_even, the converter 260 generates a channel sensing voltage CSV_even of each even channel on the basis of first and second differential amplification signals nVo_even and pVo_even of each even channel supplied from the multiplexer 250, and simultaneously generates a channel sensing voltage CSV_odd of each odd channel on the basis of first and second differential amplification signals nVo_odd and pVo_odd of each odd channel supplied from the multiplexer 250. The converter 260 converts a voltage difference between the channel sensing voltage CSV_even of each even channel and the channel sensing voltage CSV_odd of each odd channel into digital touch information DTI, and supplies the digital touch information DTI to the touch control unit 120 through the interface 210. Therefore, the touch control unit 120 generates touch point information TPI on the basis of the digital touch information DTI supplied from the converter 260 and outputs the touch point information TPI to the outside.

In the above description, the first and second differential amplification signals nVo and pVo, outputted from the differential amplifier DA of the sensing circuit 300 that is performing sensing, may be calculated as expressed in Equation (5). On the other hand, the first and second differential amplification signals nVo and pVo, outputted from the differential amplifier DA of the sensing circuit 300 that does not perform sensing, are zero.

$$nVo = Vref - \frac{C_{S-Rx} + C_{P-Rx} + Cf}{Cf} \times \Delta Vex \quad (5)$$

$$pVo = Vref + \frac{C_{S-Rx} + C_{P-Rx} + Cf}{Cf} \times \Delta Vex$$

where $C_{S-Rx}$ denotes a sensing capacitance of a receiving line, $C_{P-Rx}$ denotes a self (or parasitic) capacitance of the receiving line, Cf denotes a capacitance of a feedback capacitor, and $\Delta Vex$ denotes an amount of changed excitation signals Vex3 and Vex4.

As seen in Equation (5), the self-capacitive sensing method measures whether the sum of an inherent self (or parasitic) capacitance of a receiving line or transmitting line and a sensing capacitance (which is generated in a touch motion) has increased, thereby sensing the touch of the touch panel. Therefore, the differential amplifier DA of each sensing circuit 30 generates the first and second differential amplification signals nVo and pVo on the basis of the sensing capacitance $C_{S-Rx}$ and self capacitance $C_{P-Rx}$ of a receiving line Rx and the capacitance Cf of a feedback capacitor. In calculating an output voltage Vo outputted from the differential amplifier DA of each sensing circuit 300, namely, a difference of the first and second differential amplification signals nVo and pVo, the output voltage Vo is expressed as Equation (6) below.

$$Vo = pVo - nVo = 2 \cdot \frac{C_{S-Rx} + C_{P-Rx} + Cf}{Cf} \times \Delta Vex \quad (6)$$

As seen in Equations 5 and 6, the output voltage Vo outputted from the differential amplifier DA of each sensing circuit 300 is changed according to the sensing capacitance $C_{S-Rx}$ of a receiving line Rx and the excitation signals Vex3 and Vex4, and thus a touch signal is sensed with the changed voltage. In this case, the output voltage of a differential amplifier (which does not perform sensing) for a channel is zero.

The touch panel driving apparatus according to an embodiment of the present invention senses the first and second differential amplification signals nVo and pVo, based on the change of the sensing capacitance $C_{S-Rx}$ of a receiving line Rx by the excitation signals Vex3 and Vex4 that are set according to the second sensing mode based on the self-capacitive scheme, several times and then integrates a sensing voltage, thus increasing an amplification rate of the sensing voltage. Accordingly, the influence of external noise is removed, and thus touch sensitivity is enhanced.

The above-described touch panel driving apparatus 100 generates the touch point information TPI corresponding to the touch of the touch panel 110 according to the first sensing mode based on the mutual capacitive scheme or the second sensing mode based on the self-capacitive scheme with one sensing circuit 300, and provides the touch point information TPI to the outside.

Figure 12:
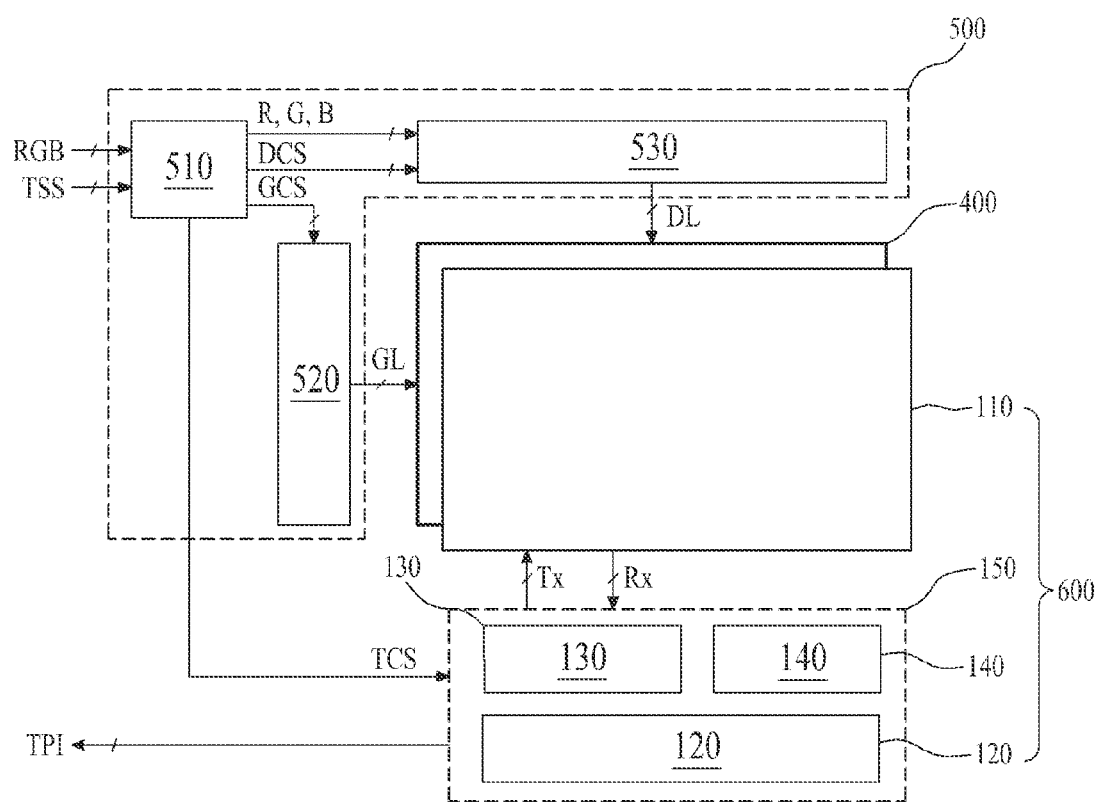
FIG. 12 is a diagram schematically illustrating a display device including a touch sensing apparatus, according to an embodiment of the present invention.

FIG. 12 is a diagram schematically illustrating a display device including a touch sensing apparatus, according to an embodiment of the present invention.

Referring to FIG. 12, a display device including a touch sensing apparatus according to an embodiment of the present invention includes a display panel 400, a display panel driver 500, and a touch panel driving apparatus 600.

The display device according to an embodiment of the present invention may be implemented as a flat type display device such as a Liquid Crystal Display (LCD) device or an organic light emitting display device. In the following description, the display device is assumed as the LCD device.

The display panel 400 includes a liquid crystal layer formed between an upper substrate and a lower substrate.

The lower substrate includes a plurality of pixels formed in respective pixel areas that are defined by intersection of a plurality of data lines DL and gate lines GL. Each of the pixels includes a thin film transistor, a pixel electrode, and a storage capacitor. The thin film transistor is switched according to a gate signal supplied to a corresponding gate line GL, and supplies a data voltage, supplied to a corresponding data line DL, to a pixel electrode. The pixel electrode generates an electric field in a corresponding liquid crystal layer according to a data voltage supplied from the thin film transistor thereto. The storage capacitor is connected to a pixel electrode and maintains the voltage of the pixel electrode.

The upper substrate includes a black matrix, a color filter, and a common electrode. The black matrix defines an open area corresponding to a pixel area of the lower substrate. The color filter includes a red color filter, a green color filter, and a blue color filter that are formed in the open area. The common electrode is formed over the upper substrate and faces a pixel electrode of each pixel. Herein, the common electrode may be formed in each pixel of the lower substrate according to a driving mode based on a driving scheme of the liquid crystal layer.

The liquid crystal layer adjusts an amount of transmitted light that is irradiated from a backlight unit according to an electric field which is generated by a difference voltage between a data voltage supplied to the pixel electrode and a common voltage supplied to the common electrode.

The display panel 400 may further include an upper polarizer adhered to the upper substrate, and a lower polarizer adhered to a lower substrate.

The display panel driver 500 may include a timing controller 510, a gate driving circuit 520, and a data driving circuit 530.

The timing controller 510 aligns input data RGB received from an external system body (or graphic card) so as to be suitable for driving of the display panel 400 to generate alignment data RGB, and supplies the alignment data RGB to the data driving circuit 520. Herein, the input data RGB include touch screen data.

Moreover, the timing controller 510 generates a gate control signal GCS and a data control signal DCS for respectively controlling the driving timing of the gate driving circuit 520 and the driving timing of the data driving circuit 530, with a timing sync signal TSS inputted from the external system body (or graphic card). Herein, the timing controller 510 may autonomously generate a vertical sync signal, a horizontal sync signal, a clock signal, etc. that are used for generating the gate control signal GCS and data control signal DCS, on the basis of a data enable signal supplied from the external system body (or graphic card).

The timing controller 510 generates a touch control signal TCS for driving the touch driving board 150 on the basis of the timing sync signal TSS or data control signal DCS.

The gate driving circuit 520 generates a gate signal according to the gate control signal GCS supplied from the timing controller 510, and sequentially supplies the gate signal to the gate lines GL. Herein, the gate driving circuit 520 may be formed at the lower substrate simultaneously when each thin film transistor is formed, and built in the lower substrate of the display panel 400.

The data driving circuit 530 latches the alignment data RGB supplied from the timing controller 510 according to the data control signal DCS supplied from the timing controller 510, converts the latched alignment data RGB into a plurality of positive analog data voltages and negative analog data voltages with a plurality of positive analog gamma voltages and negative analog gamma voltages, and selects a data voltage of a polarity corresponding to a polarity control signal to supply the selected data voltage to a corresponding data line DL in synchronization with the gate signal.

The display panel driver 500 including the timing controller 510, gate driving circuit 520, and data driving circuit 530 may be integrated in one chip and mounted on the lower substrate.

The touch panel driving apparatus 600 includes a touch panel 110, a touch control unit 120, a touch sensing unit 130, and a power supply unit 140.

The touch panel 110 is adhered to the display panel 400, and includes a plurality of transmitting lines Tx and receiving lines Rx.

The transmitting lines Tx are arranged at certain intervals in parallel to a first direction of the touch panel 110.

The receiving lines Rx are arranged at certain intervals to intersect the transmitting lines Tx.

A sensing capacitance is formed between each transmitting line Tx and each receiving line Rx. The sensing capacitance is changed according to a user's touch on the touch panel 110, and the changed sensing capacitance is supplied to a touch driving board 150 through each receiving line Rx.

The touch panel 110 is not adhered to the display panel 400, but may be formed inside the display panel 400 for reducing the thickness and weight of the display panel 400. In this case, in an embodiment, the transmitting lines Tx may be respectively formed to be separated from the gate lines GL in forming the gate lines GL, and the receiving lines Rx may be respectively formed over the data lines DL with an insulation layer therebetween. In another embodiment, the transmitting lines Tx may be formed at the lower substrate, and the receiving lines Rx may be formed at the upper substrate. In another embodiment, the transmitting lines Tx and receiving lines Rx may be formed at the same layer, in which case a transmitting line Tx or receiving line Rx corresponding to an intersected portion of a transmitting line Tx and receiving line Rx may be connected to each other by a connection pattern.

Each of the touch control unit 120, touch sensing unit 130, and power supply unit 140 has the same configuration as that of the touch panel driving apparatus 100 that has been described above with reference to FIGS. 2 to 11, and thus, the above description is applied to the elements. Hereinafter, brief functions of the elements will be described.

The touch control unit 120, touch sensing unit 130, and power supply unit 140 may be mounted on the touch driving board 150, but the embodiment is not limited thereto. The touch control unit 120, touch sensing unit 130, and power supply unit 140 may be mounted on the display panel driver 500, namely, a panel driving board (not shown) of the display device.

The power supply unit 140 generates various powers including a driving power Vdd and a reference voltage signal Vref necessary for driving of the touch panel 110, and supplies the powers to the touch control unit 120 and touch sensing unit 130.

In response to the touch control signal TCS supplied from the timing controller 510, the touch control unit 120 drives the touch sensing unit 130 in the first sensing mode based on the mutual capacitive scheme or the second sensing mode based on the self-capacitive scheme, according to a predetermined sensing mode. Furthermore, the touch control unit 120 generates the touch point information TPI on the basis of the digital touch information DTI supplied from the touch sensing unit 130, and supplies the touch point information TPI to the external system body or timing controller 510.

The touch control unit 120 generates the touch sync signal synchronized with a source output enable signal for displaying an image by horizontal line unit of the display panel 400, and drives the touch sensing unit 130 after about 5 µs elapses from a falling edge point of the touch sync signal. That is, the data driving circuit 530 outputs a data voltage to a corresponding data line DL in synchronization with a falling edge of the source output enable signal, and consequently, noise occurs at the common electrode of the display panel 400. The noise is stabilized after a certain time. Therefore, when the sensing operation of the touch sensing unit 130 is performed in a section where the noise of the common electrode occurs, a sensing error is caused by the noise of the common electrode. It can be seen that the noise of the common electrode is stabilized after about 5 µs elapses from a falling edge point of the touch sync signal. Accordingly, the touch control unit 120 drives the touch sensing unit 130 after about 5 µs elapses from the falling edge point of the touch sync signal, and thus can prevent the sensing error due to the noise of the common electrode.

The touch sensing unit 130, as described above, operates in the first sensing mode based on the mutual capacitive scheme or the second sensing mode based on the self-capacitive scheme, senses the touch of the touch panel 110, generates the digital touch information DTI, and supplies the digital touch information DTI to the touch control unit 120, according to the control of the touch control unit 120 based on a sensing mode.

The touch panel driving apparatus 600 operates in the first sensing mode based on the mutual capacitive scheme of FIG. 7 or the second sensing mode based on the self-capacitive scheme of FIG. 8, and generates the touch point information TPI regarding the touch of the touch panel 110 to supply the touch point information TPI to the external system body or timing controller 510, according to a predetermined sensing mode.

According to the embodiments of the present invention, the inherent mutual capacitance component of the touch panel is removed by using two mutually inverted excitation signals, and the touch panel driving apparatus and display device sense the touch of the touch panel with only a changed sensing capacitance based on a touch motion, thus leading to the enhancement of sensing sensitivity.

Moreover, by amplifying only a sensing capacitance difference between two transmitting lines and one receiving line, the touch panel driving apparatus and display device widen the dynamic range of the sensing voltage and moreover decrease the burden given to the converter, thus increasing the accuracy of touch sensing. Also, the touch panel driving apparatus and display device remove the influence of external noise, thus enhancing touch sensitivity.

Moreover, the touch panel driving apparatus and display device sense two differential amplification signals, based on change of the self-capacitance of a receiving line by the excitation signal, several times and then integrate the sensing voltage, thus increasing the amplification rate of the sensing voltage. Also, the touch panel driving apparatus and display device remove the influence of external noise and thus can enhance touch sensitivity.

Moreover, the touch panel driving apparatus and display device sense the touch of the touch panel with one sensing circuit in the first sensing mode based on the mutual capacitive scheme or the second sensing mode based on the self-capacitive scheme.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A touch panel driving apparatus comprising:
   a touch control unit generating a sensing control signal corresponding to a first or second sensing mode, and generating touch point information on the basis of input digital touch information, the first or second sensing mode being set for a touch panel which comprises a plurality of intersected transmitting lines and receiving lines; and
   a touch sensing unit connected to the receiving lines, and generating the digital touch information on the basis of change of a capacitance between two transmitting lines and one receiving line according to the sensing control signal based on the first sensing mode or generating the digital touch information on the basis of change of a capacitance of each of the receiving lines to supply the digital touch information to the touch control unit according to the sensing control signal based on the second sensing mode,
   wherein in the first sensing mode, the capacitance between the two transmitting lines and one receiving line is changed by mutually inverted first and second excitation signals which are respectively and directly applied to the two transmitting lines at the same time,
   wherein the touch sensing unit comprises:
   a control signal generator generating a reset control signal and mutually inverted first and second switching control signals which respectively correspond to a reset section, sensing section, and digital conversion section of a line sensing period on the basis of the sensing control signal based on the first sensing mode;
   an excitation supplier generating the mutually inverted first and second excitation signals on the basis of the sensing control signal based on the first sensing mode;
   a sensing circuit unit comprising a plurality of sensing circuits which generate mutually inverted first and second differential amplification signals on the basis of the change of the capacitance between the two transmitting lines and one receiving line based on the mutually inverted first and second excitation signals, in response to the reset control signal and mutually inverted first and second switching control signals;
a multiplexer selectively outputting the mutually inverted first and second differential amplification signals supplied from the sensing circuits, according to a channel selection signal of the touch control unit; and
a converter converting the mutually inverted first and second differential amplification signals, outputted from the multiplexer, into the digital touch information to supply the digital touch information to the touch control unit.

2. The touch panel driving apparatus of claim 1, wherein,
a high voltage section and a low voltage section of the first excitation signal are repeated by a certain time unit during the sensing section, and
the low voltage section of the first excitation signal is maintained during sections other than the sensing section.

3. The touch panel driving apparatus of claim 1, wherein each of the sensing circuits comprises:
a first input terminal connected to the receiving line;
a second input terminal receiving a reference voltage signal;
a node connector connecting the first input terminal to one of a first and a second output node and connecting the second input terminal to the other output node, in response to the mutually inverted first and second switching control signals; and
a differential amplifier unit initialized according to the reset control signal, and generating the mutually inverted first and second differential amplification signals according to two input signals which are respectively inputted to an inverting input terminal and a non-inverting input terminal through the node connector.

4. The touch panel driving apparatus of claim 3, wherein,
during the reset section, the node connector connects the first input terminal to the first output node and simultaneously connects the second input terminal to the second output node, in response to the mutually inverted first and second switching control signals,
during the sensing section, the node connector alternately connects the first and second input terminals to the first and second output nodes, in response to the mutually inverted first and second switching control signals, and
during the digital conversion section, the node connector connects the first input terminal to the second output node and simultaneously connects the second input terminal to the first output node, in response to the mutually inverted first and second switching control signals.

5. The touch panel driving apparatus of claim 3, wherein the differential amplifier unit comprises:
a differential amplifier comprising the inverting input terminal connected to the first output node, the non-inverting input terminal connected to the second output node, a non-inverting output terminal outputting the first differential amplification signal, and an inverting output terminal outputting the second differential amplification signal;
a first feedback capacitor connected between the non-inverting output terminal and the inverting input terminal;
a first reset switch parallelly connected to the first feedback capacitor, and initializing the first feedback capacitor during the reset section according to the reset control signal;
a second feedback capacitor connected between the inverting output terminal and the non-inverting input terminal; and
a second reset switch parallelly connected to the second feedback capacitor, and initializing the second feedback capacitor during the reset section according to the reset control signal.

6. The touch panel driving apparatus of claim 1, wherein,
the control signal generator generates the reset control signal and the mutually inverted first and second switching control signals which respectively correspond to the reset section, sensing section, and digital conversion section of the line sensing period on the basis of the sensing control signal based on the second sensing mode;
the excitation signal supplier generates an excitation signal on the basis of the sensing control signal based on the second sensing mode; and
the plurality of sensing circuits generates the mutually inverted first and second differential amplification signals according to the capacitance change of the receiving line based on the excitation signal, in response to the reset control signal and the mutually inverted first and second switching control signals.

7. The touch panel driving apparatus of claim 6, wherein,
the excitation signal comprises a third excitation signal supplied to odd-numbered sensing circuits of the sensing circuits, and a fourth excitation signal supplied to even-numbered sensing circuits of the sensing circuits,
the third excitation signal is maintained at a voltage level higher than a voltage level of a reference voltage signal, only during the sensing section and digital conversion section of an odd-numbered line sensing period for an odd-numbered receiving line, and
the fourth excitation signal is maintained at the voltage level higher than the voltage level of the reference voltage signal, only during the sensing section and digital conversion section of an even-numbered line sensing period for an even-numbered receiving line.

8. The touch panel driving apparatus of claim 6, wherein each of the sensing circuits comprises:
a first input terminal connected to the receiving line;
a second input terminal receiving the excitation signal;
a node connector connecting the first input terminal to one of a first and a second output node and connecting the second input terminal to the other output node, in response to the mutually inverted first and second switching control signals; and
a differential amplifier unit initialized according to the reset control signal, and generating the mutually inverted first and second differential amplification signals according to two input signals which are respectively inputted to an inverting input terminal and a non-inverting input terminal through the node connector.

9. The touch panel driving apparatus of claim 8, wherein,
only during an odd-numbered line sensing period, the node connector of an odd-numbered sensing circuit of the sensing circuits connects the first input terminal to the first output node and simultaneously connects the second input terminal to the second output node, and
only during even-numbered line sensing period, the node connector of an even-numbered sensing circuit of the sensing circuits connects the first input terminal to the first output node and simultaneously connects the second input terminal to the second output node.

10. The touch panel driving apparatus of claim 8, wherein the differential amplifier unit comprises:

a differential amplifier comprising the inverting input terminal connected to the first output node, the non-inverting input terminal connected to the second output node, a non-inverting output terminal outputting the first differential amplification signal, and an inverting output terminal outputting the second differential amplification signal;

a first feedback capacitor connected between the non-inverting output terminal and the inverting input terminal;

a first reset switch parallelly connected to the first feedback capacitor, and initializing the first feedback capacitor during the reset section according to the reset control signal;

a second feedback capacitor connected between the inverting output terminal and the non-inverting input terminal; and a second reset switch parallelly connected to the second feedback capacitor, and initializing the second feedback capacitor during the reset section according to the reset control signal.

11. A display device comprising:

a display panel;

a display panel driver displaying an image on the display panel;

a touch panel disposed on the display panel or formed inside the display panel; and a touch panel driving apparatus driving the touch panel, wherein the touch panel driving apparatus comprises:

a touch control unit generating a sensing control signal corresponding to a first or second sensing mode, and generating touch point information on the basis of input digital touch information, the first or second sensing mode being set for a touch panel which comprises a plurality of intersected transmitting lines and receiving lines; and a touch sensing unit connected to the receiving lines, and generating the digital touch information on the basis of change of a capacitance between two transmitting lines and one receiving line according to the sensing control signal based on the first sensing mode or generating the digital touch information on the basis of change of a capacitance of each of the receiving lines to supply the digital touch information to the touch control unit according to the sensing control signal based on the second sensing mode, wherein in the first sensing mode, the capacitance between the two transmitting lines and one receiving line is changed by mutually inverted first and second excitation signals which are respectively and directly applied to the two transmitting lines at the same time, wherein the touch sensing unit comprises:

a control signal generator generating a reset control signal and mutually inverted first and second switching control signals which respectively correspond to a reset section, sensing section, and digital conversion section of a line sensing period on the basis of the sensing control signal based on the first sensing mode;

an excitation signal supplier generating the mutually inverted first and second excitation signals on the basis of the sensing control signal based on the first sensing mode;

a sensing circuit unit comprising a plurality of sensing circuits which generate mutually inverted first and second differential amplification signals on the basis of the change of the capacitance between the two transmitting lines and one receiving line based on the mutually inverted first and second excitation signals, in response to the reset control signal and mutually inverted first and second switching control signals;

a multiplexer selectively outputting the mutually inverted first and second differential amplification signals supplied from the sensing circuits, according to a channel selection signal of the touch control unit; and a converter converting the mutually inverted first and second differential amplification signals, outputted from the multiplexer, into the digital touch information to supply the digital touch information to the touch control unit.

12. The display device of claim 11, wherein each of the sensing circuits comprises:

a first input terminal connected to the receiving line;

a second input terminal receiving a reference voltage signal;

a node connector connecting the first input terminal to one of a first and a second output node and connecting the second input terminal to the other output node, in response to the mutually inverted first and second switching control signals; and a differential amplifier unit initialized according to the reset control signal, and generating the mutually inverted first and second differential amplification signals according to two input signals which are respectively inputted to an inverting input terminal and a non-inverting input terminal through the node connector.

13. The display device of claim 11, wherein the touch control unit generates a touch sync signal which is synchronized with a source output enable signal for displaying an image by a horizontal line unit of the display panel, and drives the touch sensing unit after about 5μs elapses from a falling edge point of the touch sync signal.

14. The display device of claim 12, wherein, during the reset section, the node connector connects the first input terminal to the first output node and simultaneously connects the second input terminal to the second output node, in response to the mutually inverted first and second switching control signals, during the sensing section, the node connector alternately connects the first and second input terminals to the first and second output nodes, in response to the mutually inverted first and second switching control signals, and during the digital conversion section, the node connector connects the first input terminal to the second output node and simultaneously connects the second input terminal to the first output node, in response to the mutually inverted first and second switching control signals.

15. The display device of claim 12, wherein the differential amplifier unit comprises:

a differential amplifier comprising the inverting input terminal connected to the first output node, the non-inverting input terminal connected to the second output node, a non-inverting output terminal outputting the first differential amplification signal, and an inverting output terminal outputting the second differential amplification signal;

a first feedback capacitor connected between the non-inverting output terminal and the inverting input terminal;

a first reset switch parallelly connected to the first feedback capacitor, and initializing the first feedback capacitor during the reset section according to the reset control signal;

a second feedback capacitor connected between the inverting output terminal and the non-inverting input terminal; and a second reset switch parallelly connected to the second feedback capacitor, and initializing the second feedback capacitor during the reset section according to the reset control signal.

16. The display device of claim 11, wherein, the control signal generator generates the reset control signal and the mutually inverted first and second switching control signals which respectively correspond to the reset section, sensing section, and digital conversion section of the line sensing period on the basis of the sensing control signal based on the second sensing mode;

the excitation signal supplier generates an excitation signal on the basis of the sensing control signal based on the second sensing mode; and the plurality of sensing circuits generates the mutually inverted first and second differential amplification signals according to the capacitance change of the receiving line based on the excitation signal, in response to the reset control signal and the mutually inverted first and second switching control signals.

17. The display device of claim 16, wherein, the excitation signal comprises a third excitation signal supplied to odd-numbered sensing circuits of the sensing circuits, and a fourth excitation signal supplied to even-numbered sensing circuits of the sensing circuits, the third excitation signal is maintained at a voltage level higher than a voltage level of a reference voltage signal, only during the sensing section and digital conversion section of an odd-numbered line sensing period for an odd-numbered receiving line, and the fourth excitation signal is maintained at the voltage level higher than the voltage level of the reference voltage signal, only during the sensing section and digital conversion section of an even-numbered line sensing period for an even-numbered receiving line.

18. The display device of claim 16, wherein each of the sensing circuits comprises:

a first input terminal connected to the receiving line;

a second input terminal receiving the excitation signal;

a node connector connecting the first input terminal to one of a first and a second output node and connecting the second input terminal to the other output node, in response to the mutually inverted first and second switching control signals; and a differential amplifier unit initialized according to the reset control signal, and generating the mutually inverted first and second differential amplification signals according to two input signals which are respectively inputted to an inverting input terminal and a non-inverting input terminal through the node connector.

19. The display device of claim 18, wherein, only during an odd-numbered line sensing period, the node connector of an odd-numbered sensing circuit of the sensing circuits connects the first input terminal to the first output node and simultaneously connects the second input terminal to the second output node, and only during an even-numbered line sensing period, the node connector of an even-numbered sensing circuit of the sensing circuits connects the first input terminal to the first output node and simultaneously connects the second input terminal to the second output node.

20. The display device of claim 18, wherein the differential amplifier unit comprises:

a differential amplifier comprising the inverting input terminal connected to the first output node, the non-inverting input terminal connected to the second output node, a non-inverting output terminal outputting the first differential amplification signal, and an inverting output terminal outputting the second differential amplification signal;

a first feedback capacitor connected between the non-inverting output terminal and the inverting input terminal;

a first reset switch parallelly connected to the first feedback capacitor, and initializing the first feedback capacitor during the reset section according to the reset control signal;

a second feedback capacitor connected between the inverting output terminal and the non-inverting input terminal; and a second reset switch parallelly connected to the second feedback capacitor, and initializing the second feedback capacitor during the reset section according to the reset control signal.

* * * * *